(12) United States Patent
Fan et al.

(10) Patent No.: US 9,064,278 B2
(45) Date of Patent: Jun. 23, 2015

(54) SYSTEM FOR MANAGING, STORING AND PROVIDING SHARED DIGITAL CONTENT TO USERS IN A USER RELATIONSHIP DEFINED GROUP IN A MULTI-PLATFORM ENVIRONMENT

(75) Inventors: Guangbin Fan, Santa Clara, CA (US); Jiafeng Zhu, San Ramon, CA (US); Nino Vidovic, Saratoga, CA (US); George Vanecek, Jr., Madison, WI (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/223,500

(22) Filed: Sep. 1, 2011

(65) Prior Publication Data

US 2012/0173356 A1 Jul. 5, 2012

Related U.S. Application Data

(60) Provisional application No. 61/428,763, filed on Dec. 30, 2010.

(51) Int. Cl.
*G06F 21/00* (2013.01)
*G06Q 30/06* (2012.01)
*G06Q 10/10* (2012.01)
*G06Q 50/00* (2012.01)

(52) U.S. Cl.
CPC .......... *G06Q 30/0601* (2013.01); *G06Q 10/101* (2013.01); *G06Q 50/01* (2013.01)

(58) Field of Classification Search
USPC .......................................................... 705/51
See application file for complete search history.

(56) References Cited

U.S. PATENT DOCUMENTS

| 7,384,457 | B2 | 6/2008 | Emmons et al. |
| 7,650,361 | B1* | 1/2010 | Wong et al. ............ 707/999.107 |
| 2003/0204498 | A1* | 10/2003 | Lehnert ............................. 707/3 |

(Continued)

FOREIGN PATENT DOCUMENTS

| CN | 1777277 A | 5/2006 |
| CN | 101562550 A | 10/2009 |

(Continued)

OTHER PUBLICATIONS

"IEEE Standard for Information Technology—Telecommunications and Information exchange Between Systems—Local and Metropolitan Area Networks—Specific Requirements, Part 11: Wireless LAN Medium Access Control (MAC) and Physical Layer (PHY) Specifications, Amendment 4: Protected Management Frames," IEEE 802.11w™, Sep. 30, 2009, 111 pages.

(Continued)

*Primary Examiner* — James A Reagan
(74) *Attorney, Agent, or Firm* — Conley Rose, P.C.; Grant Rodolph; Brandt D. Howell

(57) ABSTRACT

A system for managing, storing and providing shared digital content to a group of users in a multi-platform environment, comprising a cloud storage component configured to store digital content items that are shared by members in a user relationship defined group, and a cloud service component configured to provide one of the digital content items to a first platform for a first member of the user relationship defined group in a format suitable for the first platform and to a second platform for a second member of the user relationship defined group in a format suitable for the second platform, wherein the first platform and the second platform are different platforms.

18 Claims, 19 Drawing Sheets

(56) References Cited

U.S. PATENT DOCUMENTS

| | | |
|---|---|---|
| 2005/0138192 A1 | 6/2005 | Encarnacion et al. |
| 2005/0138193 A1 | 6/2005 | Encarnacion et al. |
| 2006/0105749 A1 | 5/2006 | Han et al. |
| 2008/0189395 A1 | 8/2008 | Stremel et al. |
| 2009/0260044 A1 | 10/2009 | Wang et al. |
| 2010/0070381 A1 | 3/2010 | Shea et al. |
| 2010/0161813 A1 | 6/2010 | Avasarala |
| 2011/0221962 A1* | 9/2011 | Khosravy et al. ............. 348/563 |

FOREIGN PATENT DOCUMENTS

| | | | | |
|---|---|---|---|---|
| GB | 2457892 A | | 9/2009 | |
| WO | 2005109829 A1 | | 11/2005 | |
| WO | WO 2005109829 A1 * | | 11/2005 | ............. H04L 29/08 |
| WO | 2010108053 A1 | | 9/2010 | |
| WO | WO 2010108053 A1 * | | 9/2010 | |

OTHER PUBLICATIONS

"IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications," IEEE 802.11™, Jun. 12, 2007, 1232 pages.

Foreign Communication From a Counterpart Application, European Application No. 11853984.0, Extended European Search Report dated Aug. 19, 2013, 5 pages.

Foreign Communication From a Counterpart Application, PCT Application No. PCT/CN2011/083783, International Search Report dated Mar. 15, 2012, 7 pages.

Foreign Communication From a Counterpart Appliction, PCT Application No. PCT/CN2011/083783, Written Opinion dated Mar. 15, 2012, 7 pages.

Foreign Communication From a Counterpart Application, European Application No. 11853984.0, European Search Report dated Mar. 18, 2014, 6 pages.

Foreign Communication From a Counterpart Application, Russian Application No. 2013135500/08, Russian Office Action dated Mar. 24, 2015, 5 pages.

Foreign Communication From a Counterpart Application, Russian Application No. 2013135500/08, English Translation of Russian Office Action dated Mar. 24, 2015, 7 pages.

* cited by examiner

SYSTEM FOR MANAGING, STORING AND PROVIDING SHARED DIGITAL CONTENT TO USERS IN A USER RELATIONSHIP DEFINED GROUP IN A MULTI-PLATFORM ENVIRONMENT

CROSS-REFERENCE TO RELATED APPLICATIONS

The present application claims the benefit of U.S. Provisional Patent Application No. 61/428,763 filed Dec. 30, 2010 by Guangbin Fan et al. and entitled "Method and System for Family Digital Plan," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A digital family plan provides communications and/or media services to a family of a plurality of members. Current digital family plans are limited to offering some digital items or services, such as cell phone family calling plans. The digital items may be limited to the hardware, software, or platform used by the customers. Further, in some digital family plans, the users or members of a family or group typically need to repurchase the same digital item that was previously purchased by another member of the same family. This prevents the users to buy efficiently digital items or content, e.g., if the content owner or provider cannot sell enough copies of the same digital item to a number of the users. A more valuable digital family plan to customers may be one that handles the distribution of a greater variety of digital content to the family members, e.g., including applications, electronic books (ebooks), user generated content, premium contents, etc. It is also desirable to distribute the digital content to an increasing number of smart devices associated with the family members that may be based on different technologies or platforms.

SUMMARY

In one embodiment, the disclosure includes a system for managing, storing and providing shared digital content to a group of users in a multi-platform environment, comprising a cloud storage component configured to store digital content items that are shared by members in a user relationship defined group, and a cloud service component configured to provide one of the digital content items to a first platform for a first member of the user relationship defined group in a format suitable for the first platform and to a second platform for a second member of the user relationship defined group in a format suitable for the second platform, wherein the first platform and the second platform are different platforms.

In another embodiment, the disclosure includes a network component, comprising a transceiver configured to communicate with a storage and to communicate with a plurality of user relationship defined group member devices wherein at least two of the member devices comprise different platforms, wherein the storage comprises a plurality of digital content items shared by the user relationship defined group members, and a logic unit configured to manage access to the plurality of digital content items by the user relationship defined group members and further configured to provide one of the plurality of digital content items to a first platform for a first member of the user relationship defined group in a format compatible with the first platform and to provide the one of the plurality of digital content items to a second platform for a second member of the user relationship defined group in a format compatible with the second platform, wherein the first and second platforms are different.

In another embodiment, the disclosure includes a computer implemented method comprising storing a plurality of digital content items shared by a plurality of user relationship defined group members in one or more cloud network storage devices, implementing, with a processor, group controls on the plurality of digital content items, wherein different user relationship defined group members have different rights of access to the plurality of digital content items, and providing, with a transmitter, one of the plurality of digital content items to a first platform for a first user relationship defined group member in a first platform format and providing the one of the plurality of digital content items to a second platform for a second user relationship defined group member in a second platform format, wherein the first platform is different from the second platform.

In yet another embodiment, the disclosure includes a computer implemented method of delivering digital content to a user comprising transmitting with a transmitter a first portion of digital content to a first device via a first transmission channel, receiving a request from the user to transfer receiving of the digital content from the first device to a second device, and transmitting with a transmitter a second portion of the digital content to the second device via a second transmission channel.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Currently available or proposed digital family plans, such as the MAC Family Pack and the Gold Live XBOX Family Plan, lack many useful features and are not offered via Internet Service Providers (ISPs), which may limit the usefulness or popularity of such systems. Disclosed herein is a system and methods for providing a digital family plan and a plurality of services, which may not be supported by existing digital family plans. The system and methods may also be provided or supported by ISPs, which may have a plurality of subscribers including family subscribers that comprise a plurality of family members. The system may provide family digital plan asset management, such as purchasing, sharing, and consuming services among a plurality of family members. The system may also provide a family space creation and cloud service, family member subscription, and family space provisioning. Additionally, the system may provide to the family members a secured communication channel and flexible family licensing for the family space on a plurality of different platforms and devices. Other features of the system and methods for implementing them are described below. Although described herein in terms of a family group, the systems, methods, and apparatuses of the present disclosure are not limited to a family group, but may be applied to any user relationship defined group of users. The group may be defined by some common relationship between the users. For example, members of a family unit (e.g., father, mother, and children) may constitute a user relationship defined group by virtue of the fact that they are all members of the family. Other user relationship defined groups may include, for example, members of a class in a school, employees of an enterprise, residents of a residential neighborhood, or members of an online social media group.

Figure 1:
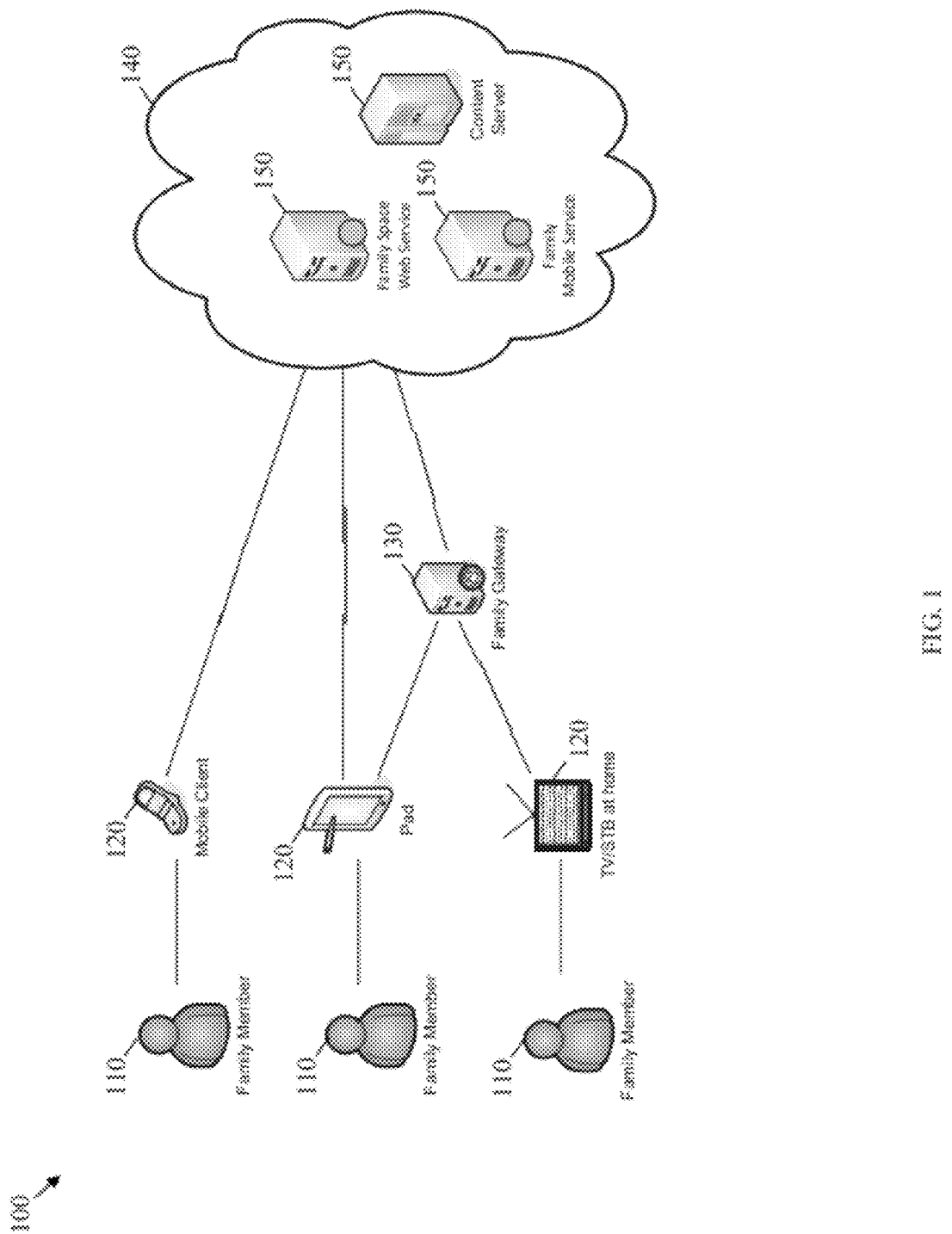
FIG. 1 is a schematic diagram of an embodiment of a digital family plan system.

FIG. 1 illustrates an embodiment of a digital family plan system 100. The digital family plan system 100 may provide and allow the sharing of digital content among a plurality of family members. Digital content may comprise any digital applications, services, communications, or combinations thereof. For example, the digital content may include programs, applications, media (e.g., music, video, etc.), and other types of digital data. The digital family plan system 100 may support a digital family plan creation, family member subscription, and content provisioning for distribution and consumption. The digital family plan system 100 may also allow the purchasing of a family license for digital content. The digital family plan system 100 may comprise a plurality of members 110, a plurality of devices 120, a family gateway 130, a family space on cloud 140, and one or more data servers on cloud 150. The components of the digital family plan system 100 may be arranged as shown in FIG. 1.

The members 110 may correspond to users or subscribers that belong to the same family. The members 110 may be identified individually, e.g., via corresponding member identifications (IDs), collectively, e.g., via the same family ID, or both. For example, the members may use individual login information, such as usernames and passwords, shared login information, such as family shared username and password, or both. The members 110 may have the same or different access levels for content, e.g., the same or different authorizations to access different content. The members 110 may comprise one or more administrators, such as parents, that determine the access levels or authorizations to one or more user members, such as children. The user members 110 may have access restrictions to some services that may only be available to the administrator members, such as some digital content access, digital family plan management and provisioning, digital content purchasing, and/or other functions and services related to the digital family plan usage.

The devices 120 may be any devices configured to provide access to at least some of the digital content of the digital family plan. The devices 120 may be any user mobile devices configured to access the family gateway 130, the family space on cloud 140, and/or the data servers on cloud 150. For example, the user devices 120 may comprise mobile phones, personal digital assistants (PDAs), portable computers, and/or any other wireless devices. The user devices 120 may comprise infrared ports, Bluetooth interfaces, Institute of Electrical and Electronics Engineers (IEEE) 802.11 compliant wireless interfaces, and/or any other wireless communication systems that enable the user devices 120 to communicate wirelessly. Additionally or alternatively, the user devices 120 may communicate using fixed links, such as wired cables and/or fiber optic cables, to access the family gateway 130, the family space on cloud 140, and/or the data servers on cloud 150. The fixed link may implement Ethernet, Asynchronous Transfer Mode (ATM), Internet Protocol (IP), or any other suitable protocol. Such user devices 120 may be fixed devices, including personal computers (PCs) such as desktop computers, telephones such as voice over IP (VoIP) telephones, and/or set top boxes. In some embodiments, the user devices 120 may comprise portable devices, such as laptop computers or cordless phones, which may use fixed links to establish communications.

The family gateway 130 may be located at a family residence and configured to provide the devices 120 access to the family space on cloud 140. The family gateway 130 may comprise a storage to store locally at least some of the digital content of the digital family plan, e.g., at the family residence. For example, the family gateway 130 may comprise a data cache for digital content at the family residence. The family space on cloud 140 may be any network space associated with the digital family plan on the cloud, e.g., the Internet or other network. The family space on cloud 140 may comprise information about the family digital plan, such as subscription, authorization, and/or licensing information for members. In some scenarios, the family space on cloud 140 may also provide digital family plan content management. The data servers on cloud 150 may be any device, component, or apparatus configured to store remotely or generate at least some of the digital content of the digital family plan. For instance, the data servers 150 may comprise a family space web service, a content server, and/or a family mobile service.

The digital family plan system 100 may offer a service for an administrator or family owner, which may be one of the members 110, to create the digital family plan including the family space on cloud 140. The digital family plan may enable various kinds of devices 120, as described above, to access the family gateway 130 and/or the family space on cloud 140. The members 110 may then use the devices 120 to purchase, share, and enjoy digital content from the family space 140 and/or the data servers on cloud 150. The devices 120 may also store some digital content or copies of digital content on the family gateway 130 and/or the data servers on cloud 150. The family gateway 130 and/or the family space on cloud 140 may be configured to handle access control and/or license control for the members 110. New members 110 may also be added at any time to the digital family plan. Each member 110 may have the right to access shared digital content and request the administrator or family owner to purchase desired digital goods. The access right to members 110 may be determined by the family administrator.

Figure 2:
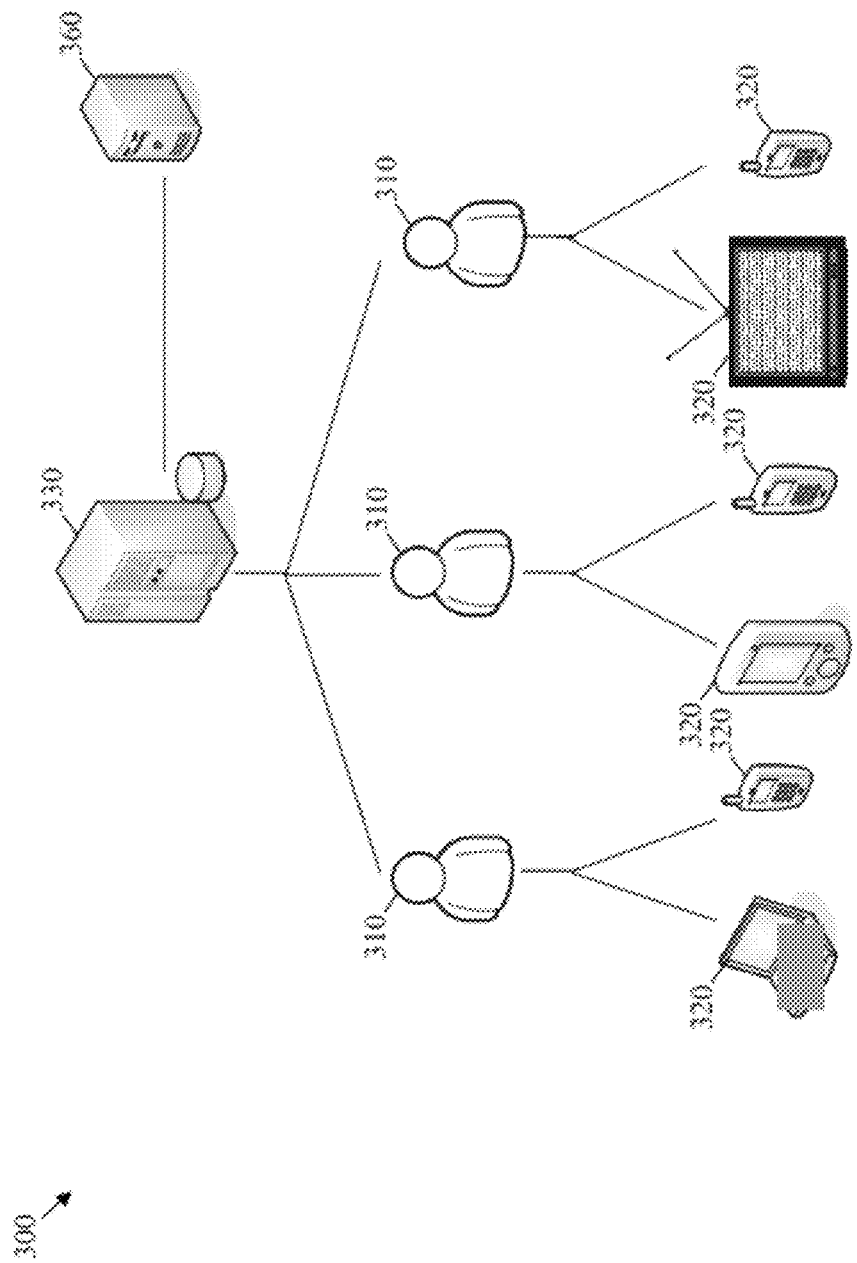
FIG. 2 is a schematic diagram of an embodiment of a digital family plan architecture.

FIG. 2 illustrates an embodiment of a digital family plan architecture 300. The digital family plan architecture 300 may be used to provide digital family plan services, e.g., in the digital family plan system 100. The digital family plan architecture 300 may comprise a plurality of members 310, a plurality of devices 320, and a family space 330. The members 310 and the devices 320 may be similar to the members 110 and the devices 120, respectively. The family space 330 may be configured similar to the family space on cloud 140. The digital family plan architecture 300 may also comprise a licensing engine 360 that may be coupled to the family space 330. The components of the digital family plan architecture 300 may be arranged as shown in FIG. 2.

The digital family plan architecture 300 may have a topology, where the family space 350 corresponds to a first tier and is associated with multiple members 310, the members 310 correspond to a second tier and are each associated with multiple devices 320, and the devices 320 correspond to a third tier. Specifically, the family space 330 may provide the digital family plan services to each of the members 310. The members 310 may each use one or more devices 320 to access the family space 330 and receive the digital family plan services, applications, and content. A member 310 may send an authentication request to the family space 330 to obtain access rights to the family space 330. Each authenticated member 310 may use one or more of the devices 320 to access the family space 300 and receive digital content. The devices 320 may be used to trigger actions in the family space 330, such as content downloading, installation, viewing, or combinations thereof. The actions in the family space 330 may trigger a request for a licensing service to the licensing engine 360. The licensing engine 360 may then grant the member 310 the license or right for accessing the requested action at the family space 330. This licensing scheme for digital content in the digital family plan architecture 300 may enable copy right protection and increase the copy sale of digital content or digital goods.

Figure 3:
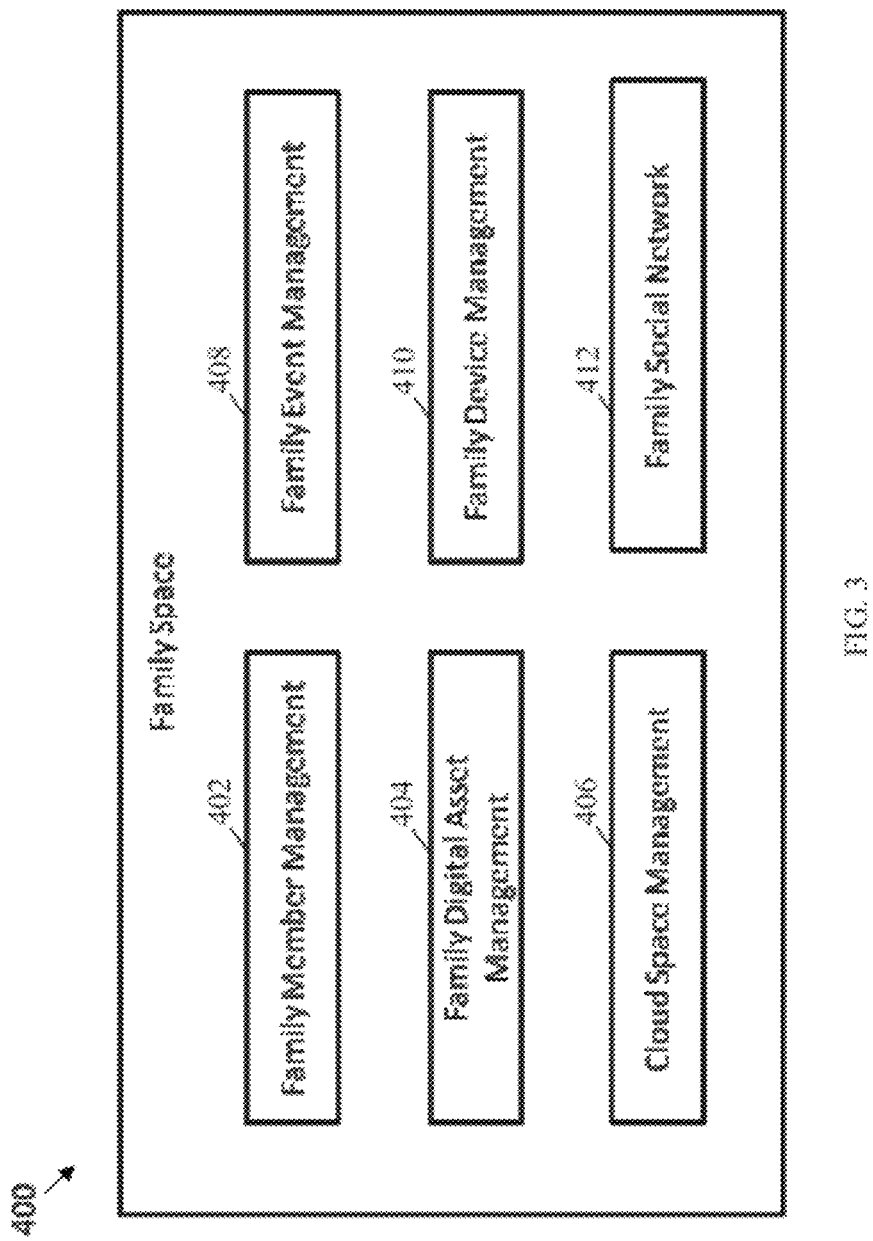
FIG. 3 is a schematic diagram of an embodiment of a family space.

FIG. 3 illustrates an embodiment of a family space 400, which may correspond to the family space on cloud 140. The family space 400 may comprise a family member management 402, a family digital asset management component 404, a cloud space storage management component 406, a family event management component 408, a family device management component 410, and a family social network management component 412. These components may be implemented using software, hardware, or both.

The family member management component 402 may be configured to enable a new member application or service, manage it, and approve its process. The family digital asset management component 404 may be configured to hold digital content that may be purchased by family members with Digital Right Management and access control. It may be configured to provide a service for a family space owner (e.g., administrator) to control the access of digital content for at least some of the members. The family cloud space storage management component 406 may also allow the storing, sharing, and gifting of digital content among family members. The family event management component 408 may organize events for at least some of family members, and synchronize calendar from members' devices (e.g. smart phone, laptop). The family device management component 410 may be configured to allow family members to register their devices to family space and to directly accessing family cloud everywhere without worry about authentication, and manage policy and personal configuration issues. The family social network management component 412 may allow family space user to join multiple family, or link families to form a network. Messages, content, or events can be shared among families in the network according to the relationship configuration.

Figure 4:
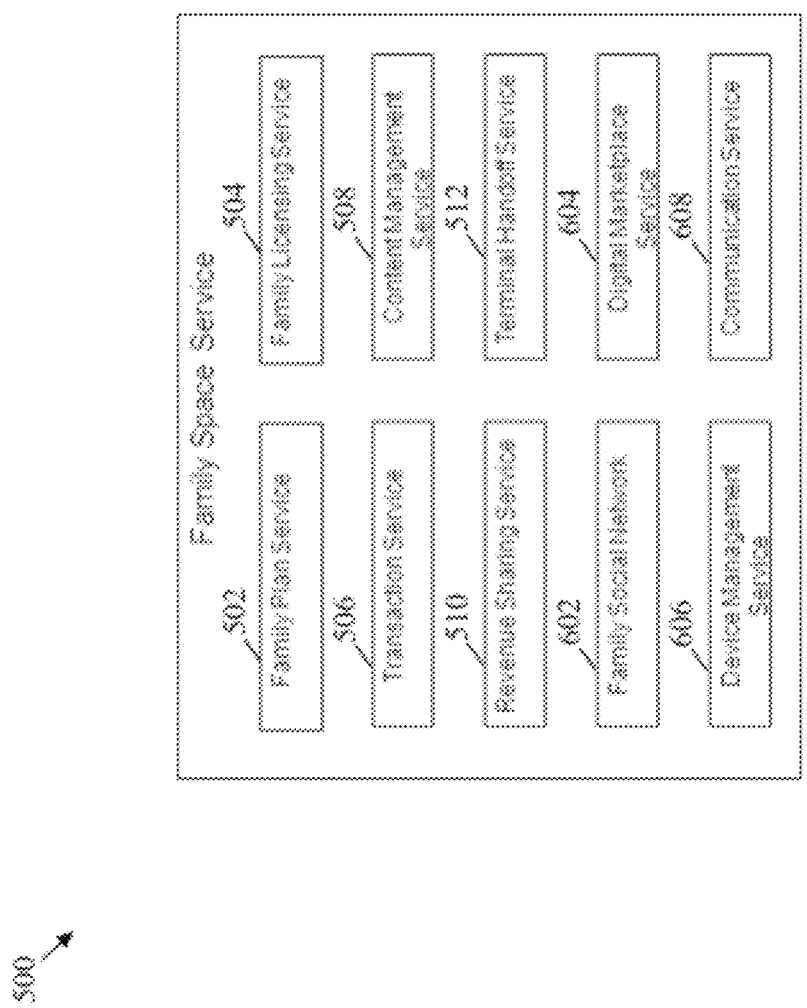
FIG. 4 is a schematic diagram of another embodiment of a family space.

FIG. 4 illustrates an embodiment of another family space 500, which may correspond to the family space on cloud 140. The family space 500 may comprise a family plan service component 502, a family licensing service component 504, a transaction service component 506, a content management service component 508, a revenue sharing service component 510, and a terminal handoff service component 512. The family space 500 may also comprise a family social network component 602, a digital marketplace service component 604, a device management service component 606, and a communication service component 608. These components may be implemented using software, hardware, or both.

The family plan service component 502 may manage or support the family plan services or applications that may be subscribed to and received by family members. The family licensing service component 504 may grant digital content access rights and record installation/review records, and provide licenses to the family members. The transaction service component 506 may allow user purchasing of transactions and support related status. The content management service component 508 may correspond to one of family space content management activities, such as add, remove, update, renew, transfer, or other content management activities. The revenue sharing service component 510 may handle the income percentage of each involved party (e.g., content provider, ISP, System, etc.) in a family content purchasing activity. The terminal handoff service component 512 may enable content viewing user experience across various devices, platforms, and/or geographic locations. For example, the terminal handoff service component 512 may allow a member or user to review a movie, stop in the middle of the movie, and then continue to review the movie from another device or location. This may be different from current handoff solutions, which may only enable continuous review from one device (e.g., Television (TV)) to another in the same home or location. The terminal handoff service component 512 may reformat digital data from one format to a second format to facilitate delivering the digital content to the device in a format compatible with the device. Furthermore the format that is compatible for the first device prior to handoff may be different from the format that is compatible with the second device after handoff. Additionally, the digital content may be delivered to the first device over a first communication channel (e.g., a wireless communication channel) and may be delivered to the second device over a different communication channel (e.g., a different wireless communication channel or wired communication channel such as cable or DSL).

The family social network component 602 may provide social networking services for the family members. The digital marketplace service component 604 may support market place activities, such as the purchase and/or download of digital content. The device management service component 606 may manage the different devices, which may include providing access and maintaining status. The communication service component 608 may manage the communications with the different devices.

In other embodiments, the family space may comprise different combinations of the components in the family space 400 and the family space 500. Additionally or alternatively, the family space may comprise other components to manage the family space services, the digital content, the members, and the devices. The components of the family space may also provide the subscription, authorization, and/or licensing of family members, or combinations thereof.

Figure 5:
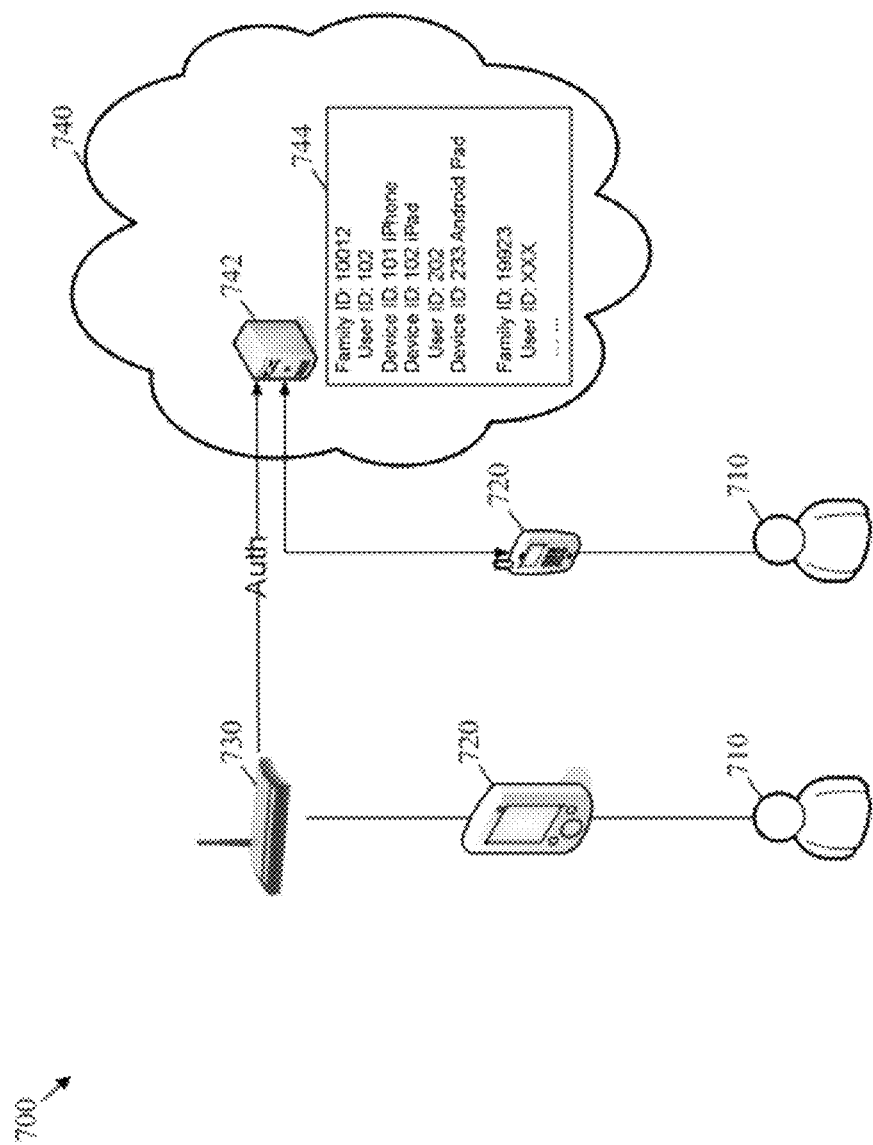
FIG. 5 is a schematic diagram of an embodiment of a family device registration scheme.

FIG. 5 illustrates an embodiment of a family device registration scheme 700, which may be used to register subscribed devices for family members with the family space. The family device registration scheme 700 may comprise a plurality of members 710, a plurality of devices 720, and a family space cloud 740 that comprises an authorization/authentication (Auth) engine 742. The members 710, the devices 720, and family space cloud 740 may be similar to the members 110, the devices 120, and family space on cloud 140, respectively. The Auth engine 742 may be configured to authenticate and authorize the devices 720 and the members 710 to access the family space cloud 740.

A member 710 may register a device 720 by accessing the family space cloud 740. The devices 720 may be used to register the devices with the associated family members to the family plan. The registration process may comprise generating a certificate 744 that comprises a family ID for the family of members 710. The certificate 744 may also comprise a member ID for each registered member 710 and a device ID for each registered device 720 associated with the member 710. A member 710 may access the family space cloud 740 directly using the device 720, e.g., wirelessly or on the go, to register the member 710 and/or the device 720. Alternatively, a member 710 may access the family space cloud 740 via the family gateway 730 locally, e.g., at home, to register the member 710 and/or the device 720. Subsequently, the member 710 may use the device 720 to access the family space cloud 740 and request authorization from the Auth engine 742 using a corresponding ID, such as the device ID and/or the member ID. If the member 710 and the corresponding device 720 are authorized and authenticated, e.g., based on the certificate 744, then the device 720 may begin receiving services or downloading applications from the family space cloud 740.

Figure 6:
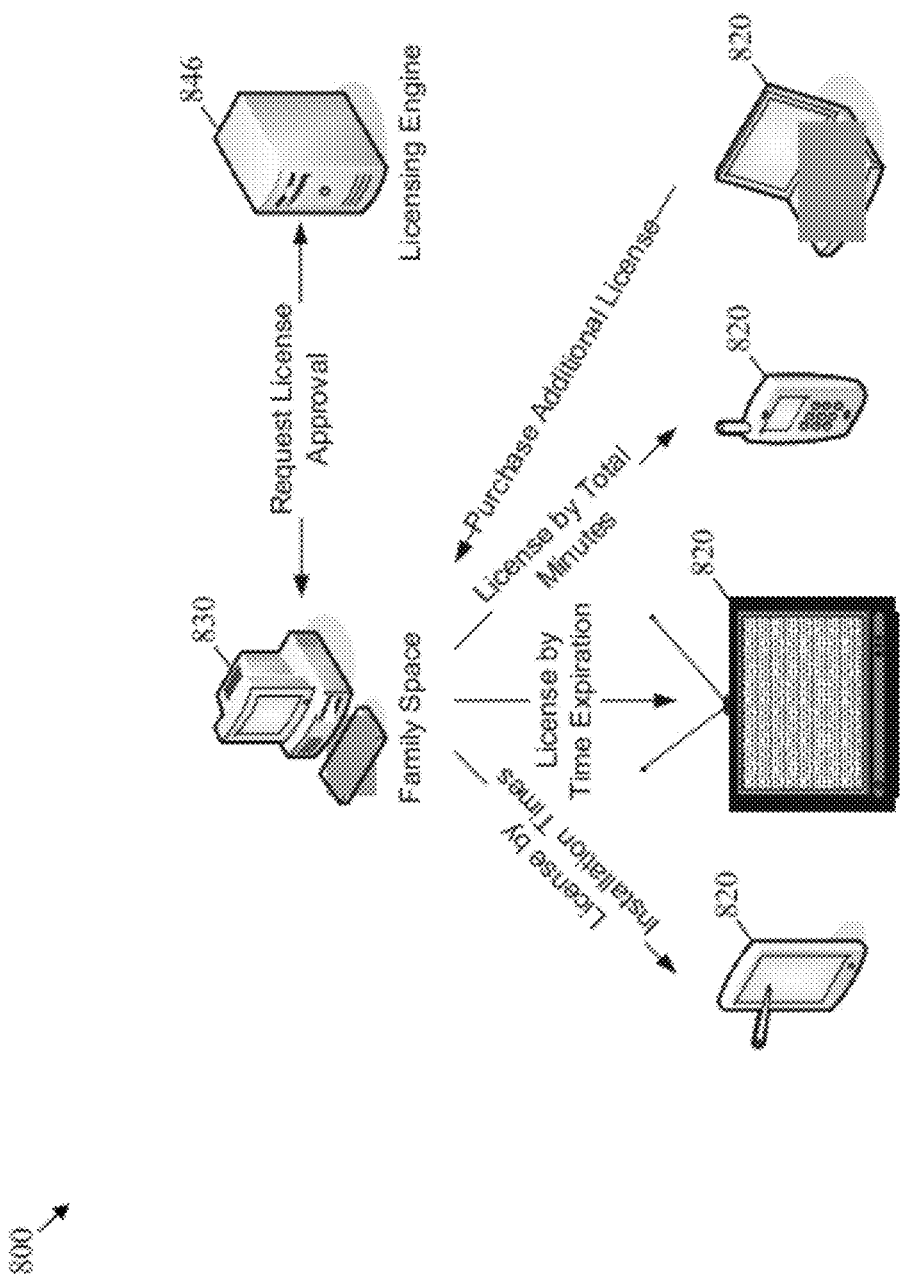
FIG. 6 is a schematic diagram of an embodiment of a family space licensing scheme.

FIG. 6 illustrates an embodiment of a family space licensing scheme 800, which may be used to provide licenses to various devices of members subscribed to a digital family plan. The family space licensing scheme 800 may comprise a plurality of devices 820, a family space 830, and a licensing engine 846 coupled to the family gateway 830. The devices 820 and the family space 830 may be configured similar the devices 120 and the family space 330, respectively. The licensing engine 846 may be configured to provide licenses for the devices 820 for receiving services from the family space 830. The licensing engine 846 may be located at or coupled to the cloud, e.g., the Internet.

A device 820, which may have been registered, may be used by a family member to obtain or purchase a license by accessing the family space 830. The member may request some content from the family space 830 using the device 820, which may trigger the license purchase request. Thus, the family space 830 may forward a new license purchase request to the licensing engine 846 to request license approval from the licensing engine 846. The licensing engine 846 may issue a license or approve the license for the device 820 or the family member of the device 820, e.g., after authorizing/authenticating the device 810 and/or its member. The license may be issued for the same device 820 or for any device 820 that may be used by the same member. Alternatively, a shared or family license may be purchased for a digital content, such as video or application, and may be shared by multiple members over various devices 820.

Different licenses may be purchased and granted for a plurality of members on a plurality of devices 820. The licenses may comprise a license limited by a total number of minutes, which may expire when the total number of minutes is used to receive or download the digital content, e.g., the service/application. The total number of minutes may be used on one or more devices 820, by one or more family members, or both. The licenses may comprise a license limited by an expiration time or date, which may also be used on one or more devices 820, by one or more family members, or both. The licenses may also comprise a license limited by installation times, which may expire when the content is downloaded or installed a number of times equal to the installation times, e.g., on one or more devices 820 and/or by one or more members.

Figure 7:
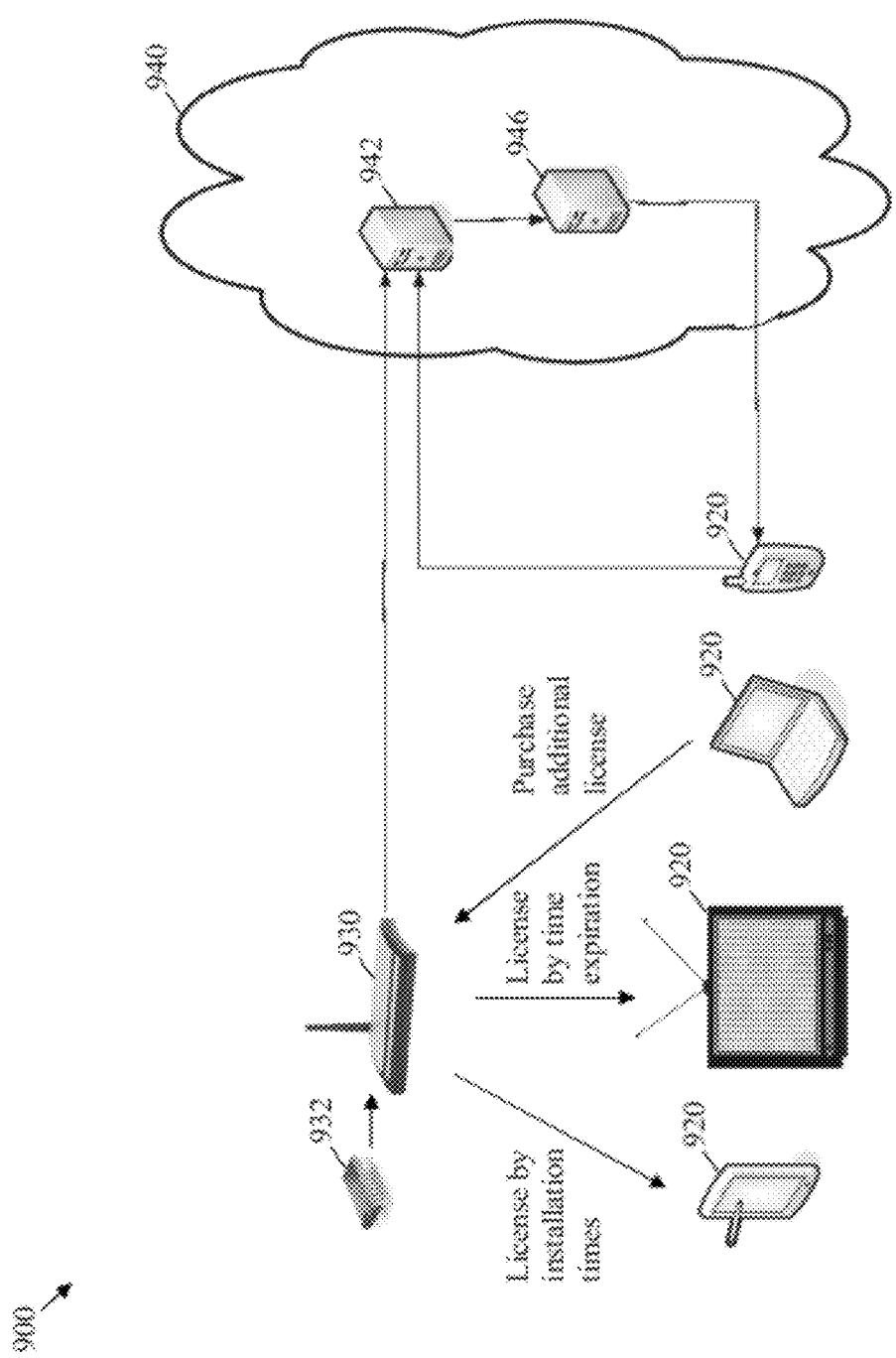
FIG. 7 is a schematic diagram of another embodiment of a family space licensing scheme.

FIG. 7 illustrates an embodiment of another family space licensing scheme 900 for providing licenses to various devices of family subscribed members. The family space licensing scheme 900 may comprise a plurality of devices 920, a family gateway 930, and a family space cloud 940, which may comprise an Authentication/Authorization (Auth) engine 942 and a licensing engine 946. The devices 920, family gateway 930, family space cloud 940, Auth engine 942, and licensing engine 946 may be configured similar to the devices 120, the family gateway 130, the family space on cloud 140, the Auth engine 742, and the licensing engine 846, respectively.

A device 920, which may have been registered, may be used by a family member to obtain or purchase a license by accessing the family space cloud 940. The member may request some content from the family space cloud 940 using the device 920, which may trigger a license purchase request in the family space cloud 940. The device 920 and the license purchase may then be authorized by the Auth engine 942. Upon authorization, the Auth engine 942 may forward the license purchase request to the licensing engine 946. In turn, the licensing engine 946 may send the requested license to the device 920. To send the license purchase request, the device 920 may access the family space cloud 940 directly (e.g., wirelessly or on the go) or locally (e.g., at home) via the family gateway 930. Similarly, the licensing engine 946 may send the requested license to the device 920 directly or via the family gateway 930. The family gateway 930 may comprise a security chip 932 for securing communications between the device 920 and the family space cloud 940, as described below. Different licenses may be purchased and granted for a plurality of devices 920, as described above. For instance, the license may be limited by an expiration time or by installation times.

Figure 8:
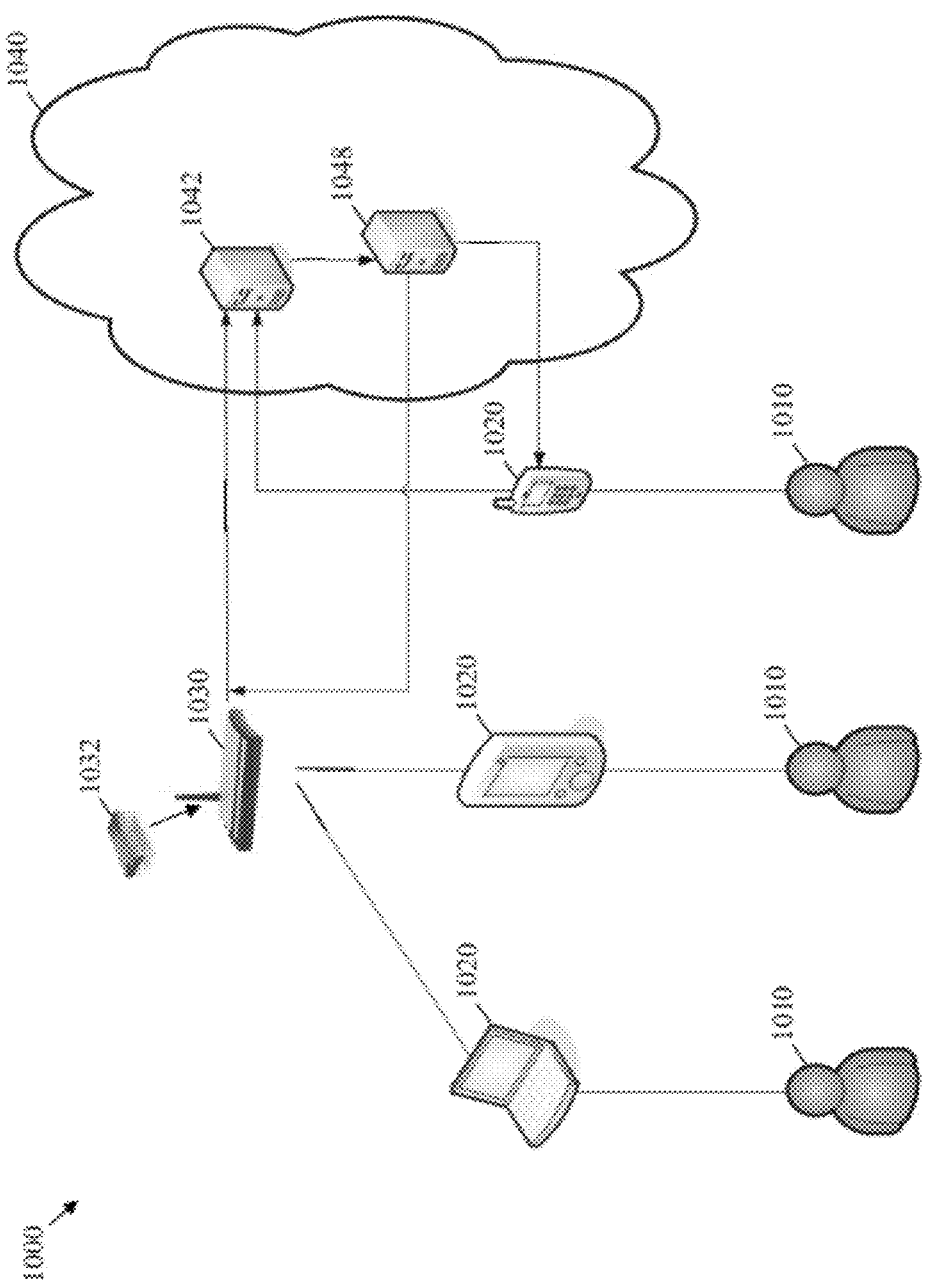
FIG. 8 is a schematic diagram of an embodiment of a communication channel security scheme.

FIG. 8 illustrates an embodiment of a communication channel security scheme 1000, which may be used to provide secured communication channels between family member devices and the family space. The communication channel security scheme 1000 may comprise a plurality of members 1010, a plurality of devices 1020, a family gateway 1030, and a family space cloud 1040, which may comprise an Auth engine 1042 and a security engine 1048. The devices 920, family gateway 930, family space cloud 940, and Auth engine 942 may be similar to the devices 120, the family gateway 130, the family space on cloud 140, and the Auth engine 742. The security engine 1048 may be configured to setup or establish a secure communication channel for a requesting device 1020.

A member 1010 may use a registered device 1020 to access the family space cloud 1030, e.g., to receive a family plan service. Accessing the family space cloud 1030 may trigger the Auth engine 1042 to authorize the device 1020 and/or the member 1010. Upon authorization, the Auth engine 1042 may request a secured communication channel for the device 1020 from the security engine 1048. The security engine 1048 may then secure a communication channel between the family space cloud 1040 and the device 1020, for instance based on a security key exchange with the device 1020. The security key may be used to decrypt the encrypted communications over the secured communication channel. The device 1020 may access the family plan cloud 1040 and communicate over the secured communication channel directly (e.g., wirelessly or on the go) or locally (e.g., at home) via the family gateway 1030. If the secured communication channel is established between the device 1020 and the family space cloud 1040 via the family gateway 1030, a security chip 1032 that may be located at or coupled to the family gateway 1030 may be used for decrypting/encrypting communications between the device 1020 and the family space cloud 1040. The security chip 1032 may share a security key with the family space cloud 1040 for ensuring the security of the communication channel.

The systems and schemes described above may provide a cloud based service that connects family members, e.g., around the world. The cloud based service may provide digital content or intangible property consuming and sharing among family members, flexible family licensing, family digital asset management, and secured family messaging, media exchange, and/or distribution channel. The cloud based service may also support and provide requesting and gifting capabilities among the family members. For example, some members may send media or digital content gifts, e.g., music or video files, to other members. Some members, such as children, may also request media or digital content purchase from other members, such as parents.

Other benefits of the systems and schemes above include the ability to access the family space or family space cloud via various types of devices, e.g., smart phones, set top boxes, or other smart devices, which may have different hardware and/or software platforms. The systems may also have lower total cost and managing effort for digital family assets (e.g., purchased/licensed digital content) in comparison to existing digital family plans. For instance, the users or members of the system may not need to worry about or handle family storage, family content backup, and family content security. The systems and schemes may also provide auto synchronization, indexing, and tagging of content. Such benefits may increase the family content sharing experience on the go, introduce a new channel to the market for application promotion, and provide enhanced family control.

Figure 9:
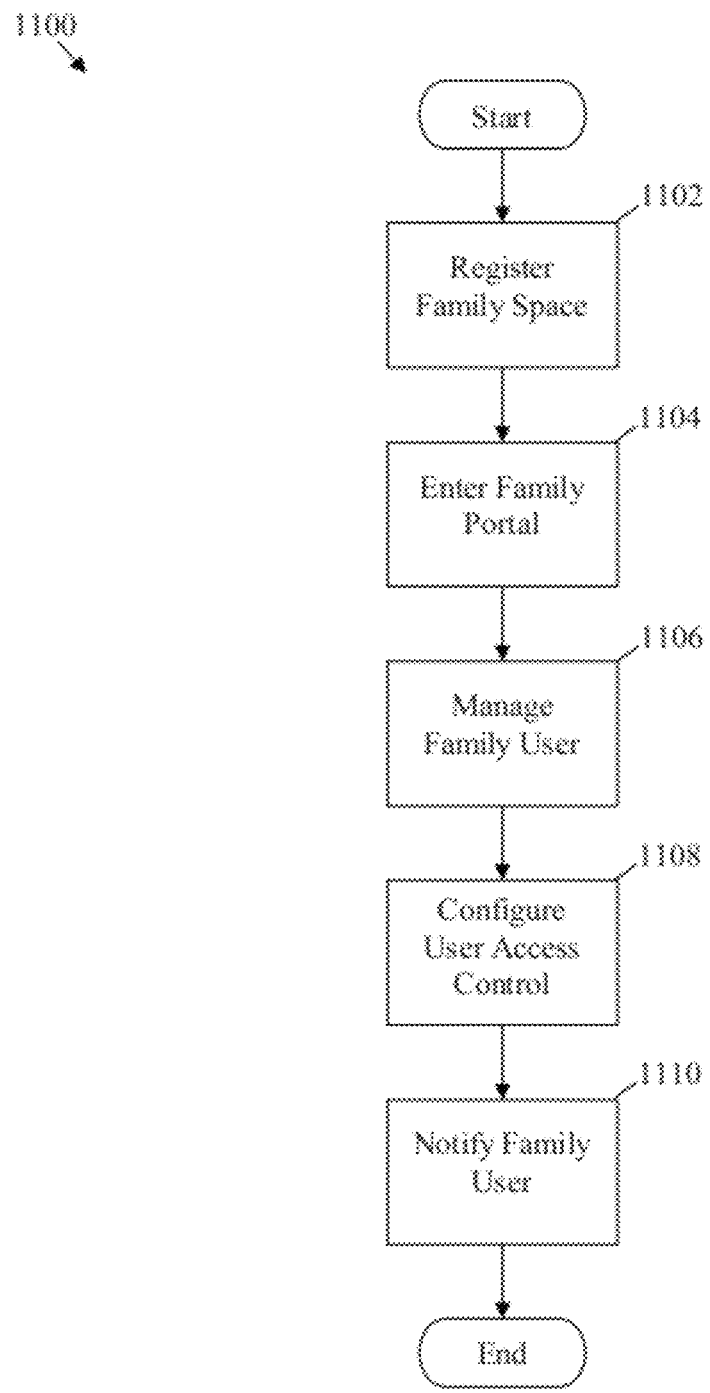
FIG. 9 is a flowchart of an embodiment of a family space creation method.

FIG. 9 illustrates a flowchart of an embodiment of a family space creation method 1100, which may be implemented in the digital family plan system 100. For instance, the family space creation method 1100 may be used to create the family space on cloud 140, register the corresponding members/devices, and set member access policies. The family space creation method 1100 may begin at block 1102, where a family space may be registered. For instance, the head of a household may register a family center or plan and hence may become the family space owner or administrator. At block 1104, a family portal may be entered. The portal may comprise an interface, a link, and/or a port between the member device and the family space, e.g. locally or on the cloud. The portal may also comprise a portion of the family space that may be allocated to a member, e.g., including content, license, access policy, and/or other components. The family space portal may be automatically created (by the family space system) after a user or member completes registration. The user or member may update or apply a corresponding template of the family space portal that may be different than other members. The portal may be accessed by the member via different devices. At block 1106, a family user may be managed. For instance, the family space owner may add family members to the space and/or may assign co-owners or co-administrators. At block 1108, user access control may be configured. The family space owner and/or a co-owner may set the access control policies and apply them to every family space member. At block 1110, a family user may be notified. The notification process may be triggered when a new member is added, a member profile is updated, or a new access control policy is granted. The method 1100 may then end.

Figure 10:
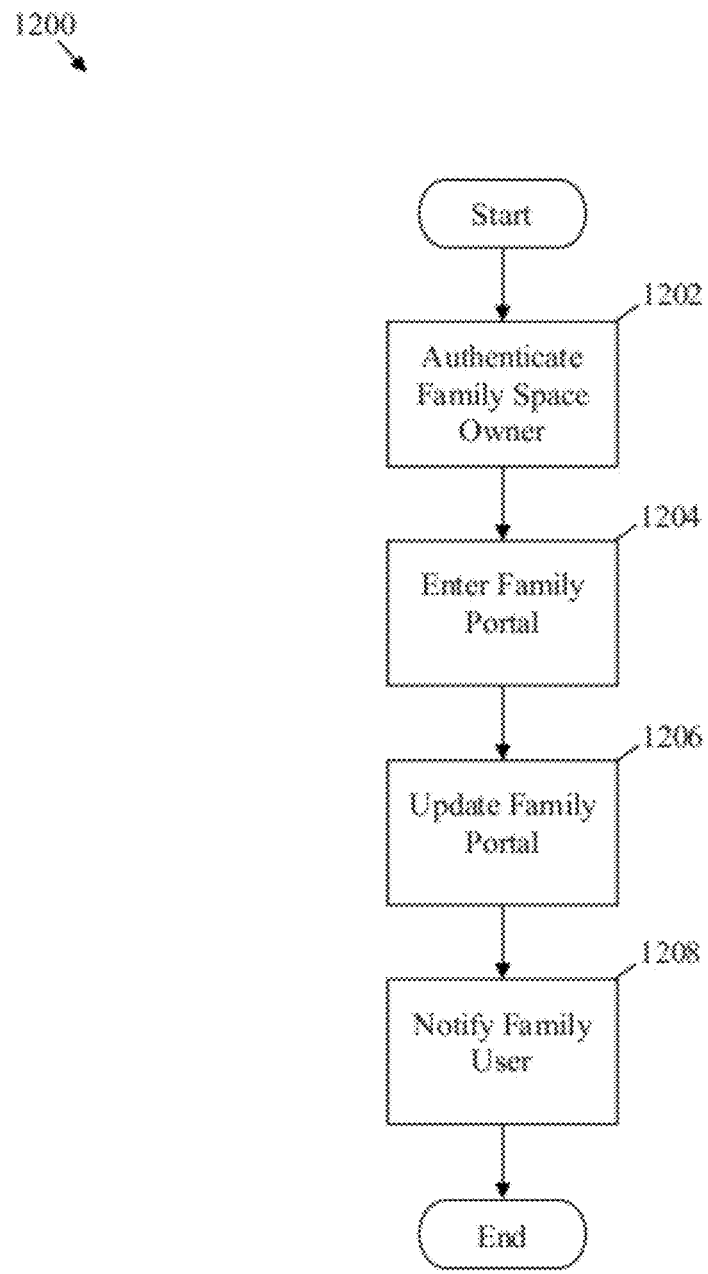
FIG. 10 is a flowchart of an embodiment of a family space management method.

FIG. 10 illustrates a flowchart of an embodiment of a family space management method 1200, which may be implemented in the digital family plan system 100. The family space management method 1200 may be used to manage the family space or portal for associated members. The family space creation method 1200 may begin at block 1202, where a family space owner may be authenticated. For instance, a family space owner or administrator may log in to a family space and may be authenticated, e.g., based on ID, password, and/or other credentials. At block 1204, a family portal may be entered. The family space owner may be authorized to enter the family space portal of a member after authentication. At block 1206, the family portal may be updated. The family space owner may indicate which component of the family space portal needs to be updated and update the component accordingly. The updated component may correspond to a member or user of the family. At block 1208, the family user may be notified. The family space may notify the family user or member about the corresponding family portal update. The method 1200 may then end.

Figure 11:
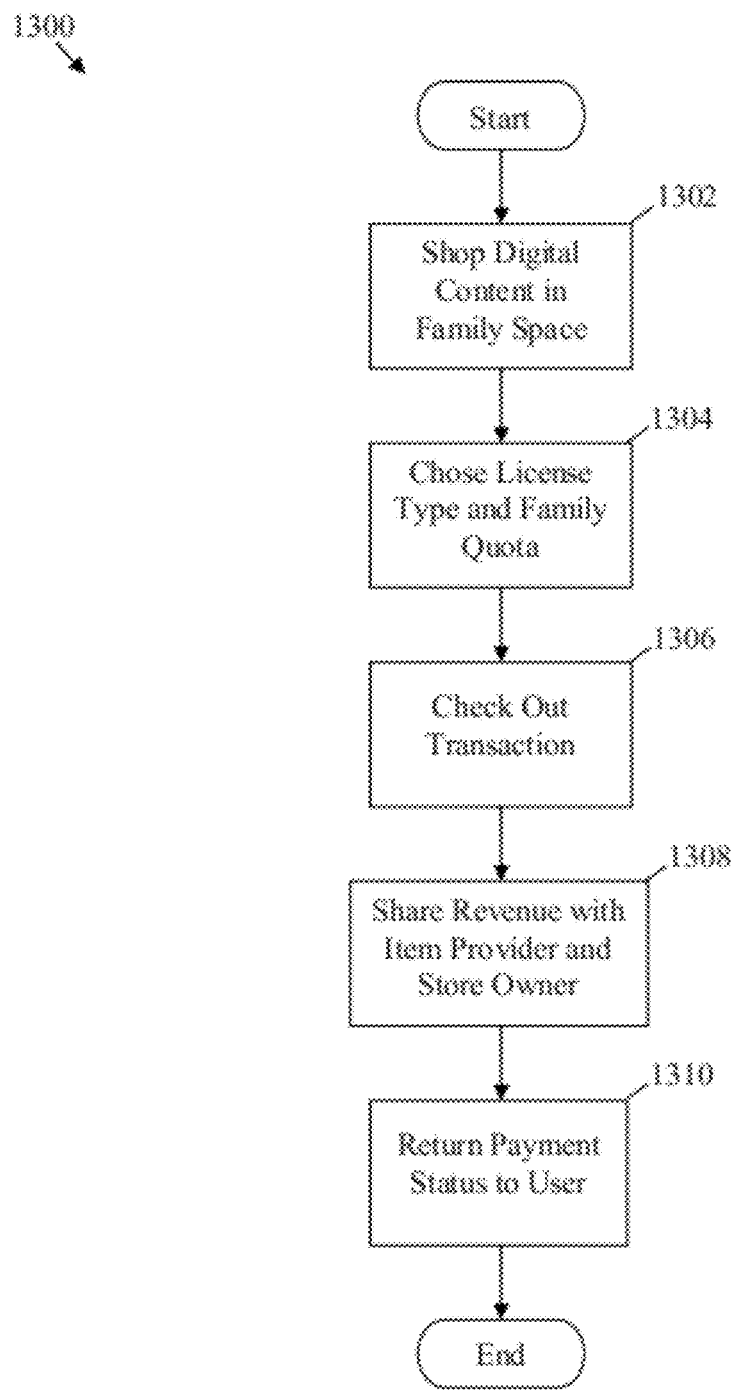
FIG. 11 is a flowchart of an embodiment of a digital content purchasing method.

FIG. 11 illustrates a flowchart of an embodiment of a digital content purchasing method 1300, which may be implemented in the digital family plan system 100. The digital content purchasing method 1300 may be used to allow a member or user in the family space to purchase digital content. The digital content purchasing method 1300 may begin at block 1302, where digital content may be shopped in the family space. The member or user may shop for digital content, for example by adding a selected digital content to a shopping card. At block 1304, a license type and family quota may be chosen. There may be a number of different license types that can be purchased, such as a single copy license or a family copy license. Different license types may also have different prices. An overall family plan may provide the family space member a certain number of consuming quota within a period of time. For example, a family plan may allow downloading, e.g., for free, about 15 applications, about five movies, and/or about 10 ebooks in about one moth period. At block 1306, a transaction may be checked out. For instance, the member or user may checkout the digital content in the shopping cart. At block 1308, revenue may be shared with the item provider or store owner. For example, the total income from selling digital content purchased by users may be shared among an ISP, the family space system provider, and/or the content provider. At block 1310, payment status may be returned to user. The payment status or confirmation may be sent to the family space member after implementing the digital content purchase. The method 1300 may then end.

Figure 12:
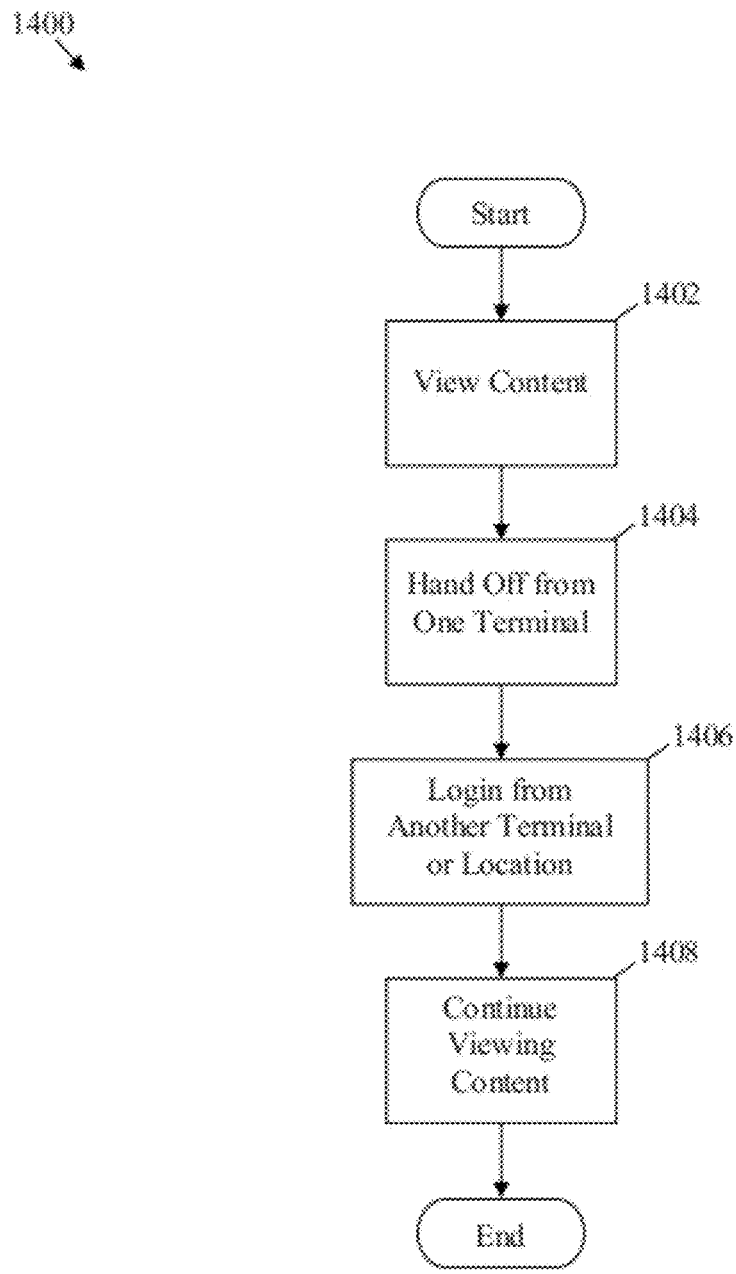
FIG. 12 is a flowchart of an embodiment of a device hand-off method.

FIG. 12 illustrates a flowchart of an embodiment of a device handoff method 1400, which may be implemented in the digital family plan system 100. The device handoff method 1400 may allow a family member to switch between devices while receiving or downloading the same digital content. The device handoff method 1400 may begin at block 1402, where some content may be viewed. For instance, a family digital plan subscriber or member may view a digital content, such as a movie. At block 1404, a hand off from one terminal may be implemented. For instance, the member or user may stop or pause viewing the digital content before completing its viewing, e.g., in the middle of the movie. At block 1406, a login from another terminal or location may be implemented. For instance, the user may decide to move to a different device or terminal, e.g., in a different location, to continue viewing the remaining portion of the content. At block 1408, viewing the content may be continued. For instance, after moving to another location (e.g., from home to office) or using another device (e.g., from TV to smart phone), the user may continue viewing the content. The method 1400 may then end.

Figure 13:
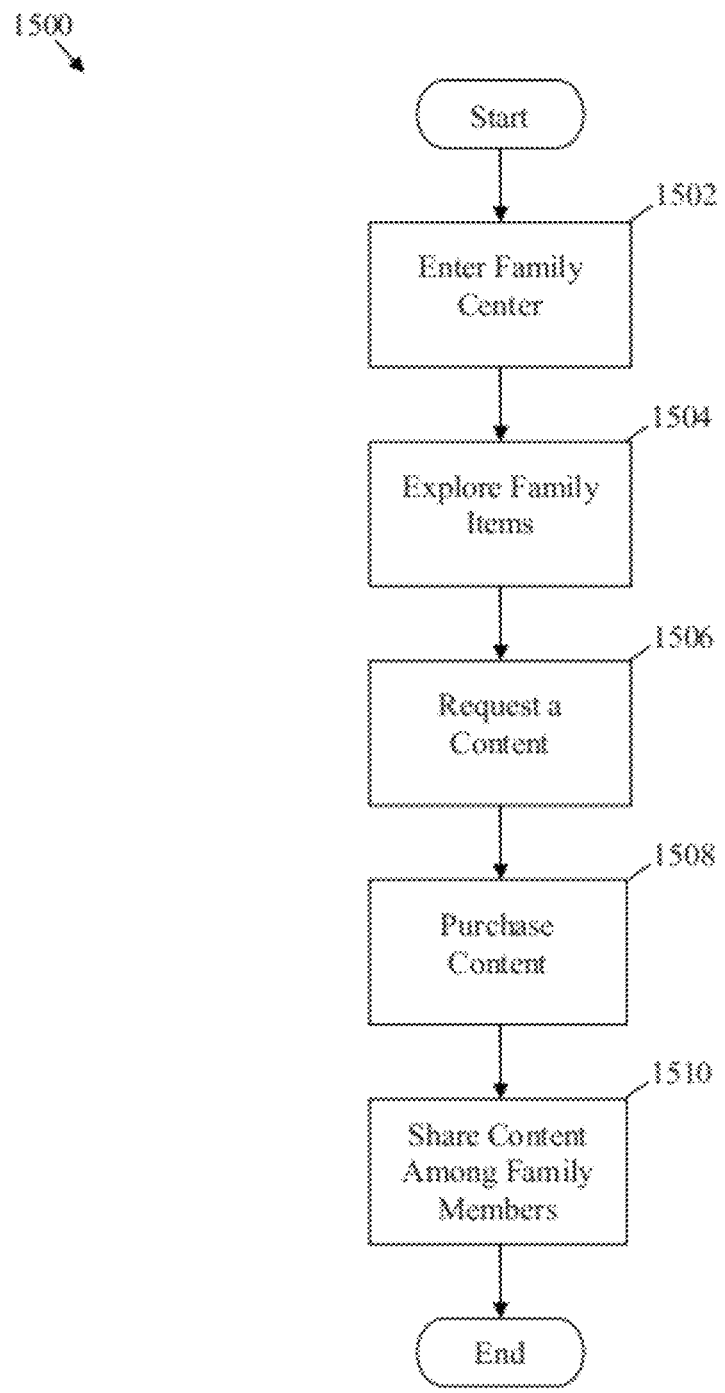
FIG. 13 is a flowchart of an embodiment of a digital content request method.

FIG. 13 illustrates a flowchart of an embodiment of a digital content request method 1500, which may be implemented in the digital family plan system 100. The digital content request method 1500 may be used by a member to request digital content from a family space owner or administrator. For example, a family member, e.g., a child, may request a purchase or a gift from the family space owner, e.g., a parent. The digital content request method 1500 may begin at block 1502, where a family center or plan may be entered. The family member may first enter the family space to request a digital content. At block 1504, family items may be explored. The member may explore the available family items at the family space, e.g. in a repository of the family space, such as applications or other digital goods available for purchase or download. At block 1506, some content may be requested. The member may request a digital content that may not be found or available in the family space. At block 1508, the content may be purchased. A family space owner or a co-owner may approve the member request and purchase the content for the family member. At block 1510, the content may be shared among family members. The method 1500 may then end.

Figure 14:
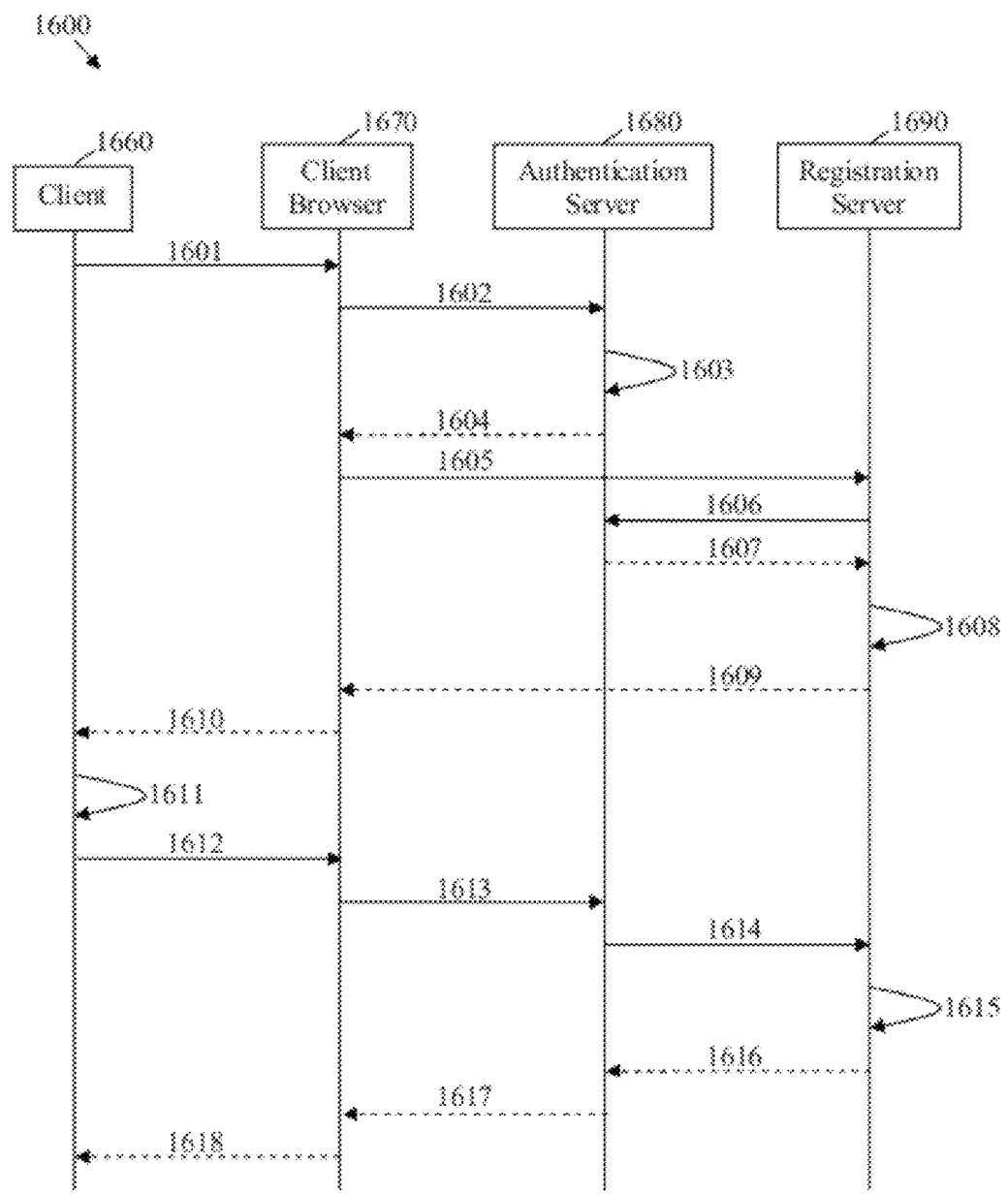
FIG. 14 is a protocol diagram of an embodiment of a device registration method.

FIG. 14 illustrates an embodiment of a device registration method 1600, which may be implemented in the digital family plan system 100. The device registration method 1600 may be used to register a member device with a family plan. The device may be registered directly, e.g., on the go or wirelessly, with the family space, e.g., on the cloud. At step 1601, a client 1660 may send a request for device registration to a client browser 1670. The client 1660 may be a member device, e.g., a device 120, and the client browser 1670 may be accessed on the client 1660 and loaded from the family space. At step 1602, the client browser 1670 may request the authentication of the device user with an authentication server 1680. The authentication server 1680 may be similar to the Auth engine 742. At step 1603, the authentication server 1680 may access the user information to authenticate the user. At step 1604, the authentication server 1680 may return the authentication result and a session key to the client browser 1670. At step 1605, the client browser 1670 may send a request for a register service to a registration server 1690. The client browser 1670 may be configured to register a member and/or device with a family plan or a family space. The registration server 1690 may also send the session key with the request to the registration server 1690. At step 1606, the registration server 1690 may return a request for session information to the authentication server 1680. The registration server 1690 may also return the session key with the request.

At step 1607, the authentication server 1680 may return session information to the registration server 1690. At step 1608, the registration server 1690 may build a client application and may cache the session. At step 1609, the registration server 1690 may return a client application to the client browser 1670. At step 1610, the application may be stored in the client 1660 using the client browser 1670. At step 1611, the client 1660 may install the application. At step 1612, the client 1660 may send a buy or purchase request to the client browser 1670. At step 1613, the client browser 1670 may forward the buy or purchase request to the authentication server 1680. At step 1614, the authentication server 1680 may prompt the registration server 1690 to destroy the session. At step 1615, the session at the registration server 1690 may be destroyed or ended. At step 1616, the registration server 1690 may return the destroy session result to the authentication server 1680. At step 1617, the authentication server 1680 may return an aggregated result about the session to the client browser 1670. At step 1618, the client browser 1670 may return or forward the result to the client 1660. The method 1600 may then end. Some of the optional steps in the method 1600 are indicated using dashed arrow lines in FIG. 14. Also, in some embodiments, other registration confirmation data is generated by the registration server 1690 in addition to or other than the client application. This registration confirmation data may be supplied to the client browser 1670 to confirm registration of the device.

Figure 15:
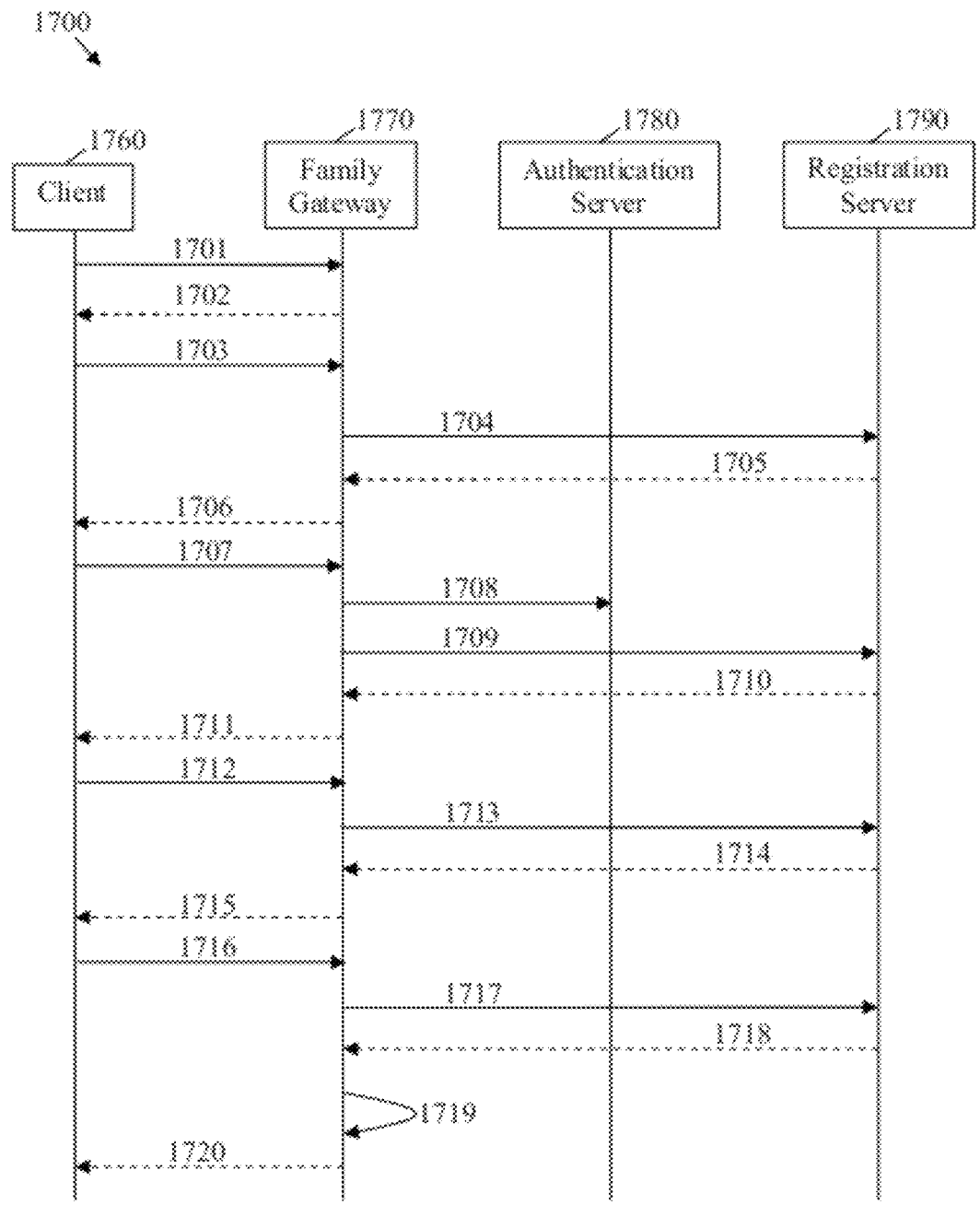
FIG. 15 is a protocol diagram of an embodiment of a gateway registration method.

FIG. 15 illustrates an embodiment of a gateway registration method 1700, which may be implemented in the digital family plan system 100. The gateway registration method 1700 may be used to register a member device with a family plan via a family gateway. The gateway registration method 1700 may be implemented using a client 1760, a family gateway 1770, an authentication server 1780, and a registration server 1790, which may be configured similar to a device 120, the family gateway 130, the Auth engine 742, and the registration server 1790, respectively. At step 1701, the client 1760 may access the family gateway 1770, e.g., using a Hypertext Transfer Protocol (HTTP). At step 1702, the family gateway 1770 may display a web page on the client 1760. At step 1703, the client 1760 may send a request to create a user account via the family gateway 1770. At step 1704, the family gateway may forward the user account creation request to the registration server 1790. At step 1705, the registration server 1790 may return the result of creating the user account to the family gateway 1770. At step 1706, the family gateway 1770 may forward the result to the client 1760. At step 1707, the client 1760 may send a request to create a family space via the family gateway 1770. The client 1760 may also send username/password with the request. At step 1708, the family gateway 1770 may request the authentication of the user from the authentication server 1780. The family gateway may also send authentication information of the user, e.g., username/password, to the authentication server 1780.

At step 1709, the family gateway 1770 may forward the family space creation request to the registration server 1790. At step 1710, the registration server 1790 may return the result of creating the family space to the family gateway 1770. At step 1711, the family gateway 1770 may forward the result to the client 1760. At step 1712, the client 1760 may send a request to link to the family space via the family gateway 1770. At step 1713, the family gateway 1770 may request a family space list from the registration server 1790. At step 1714, the registration server 1790 may return the family space list to the family gateway 1770. At step 1715, the family gateway 1770 may prompt the client 1760 to select a family space from the family space list. At step 1716, the client 1760 may indicate a selected family space to the family gateway 1770 and also send username/password to the family gateway 1770. At step 1717, the family gateway 1770 may send a request to link to the selected family space and send a gateway ID and the username/password to the registration server 1790. At step 1718, the registration server 1790 may return the result of the request, a family certificate, and an encryption key to the family gateway 1770. At step 1719, the family gateway 1770 may store the family certificate and the encryption key, which may be used to provide security for the communication channel with the client 1760. At step 1720, the family gateway 1770 may return the result from the registration server 1790 to the client 1760. The method 1700 may then end. Some of the optional steps in the method 1700 are indicated using dashed arrow lines in FIG. 15.

Figure 16:
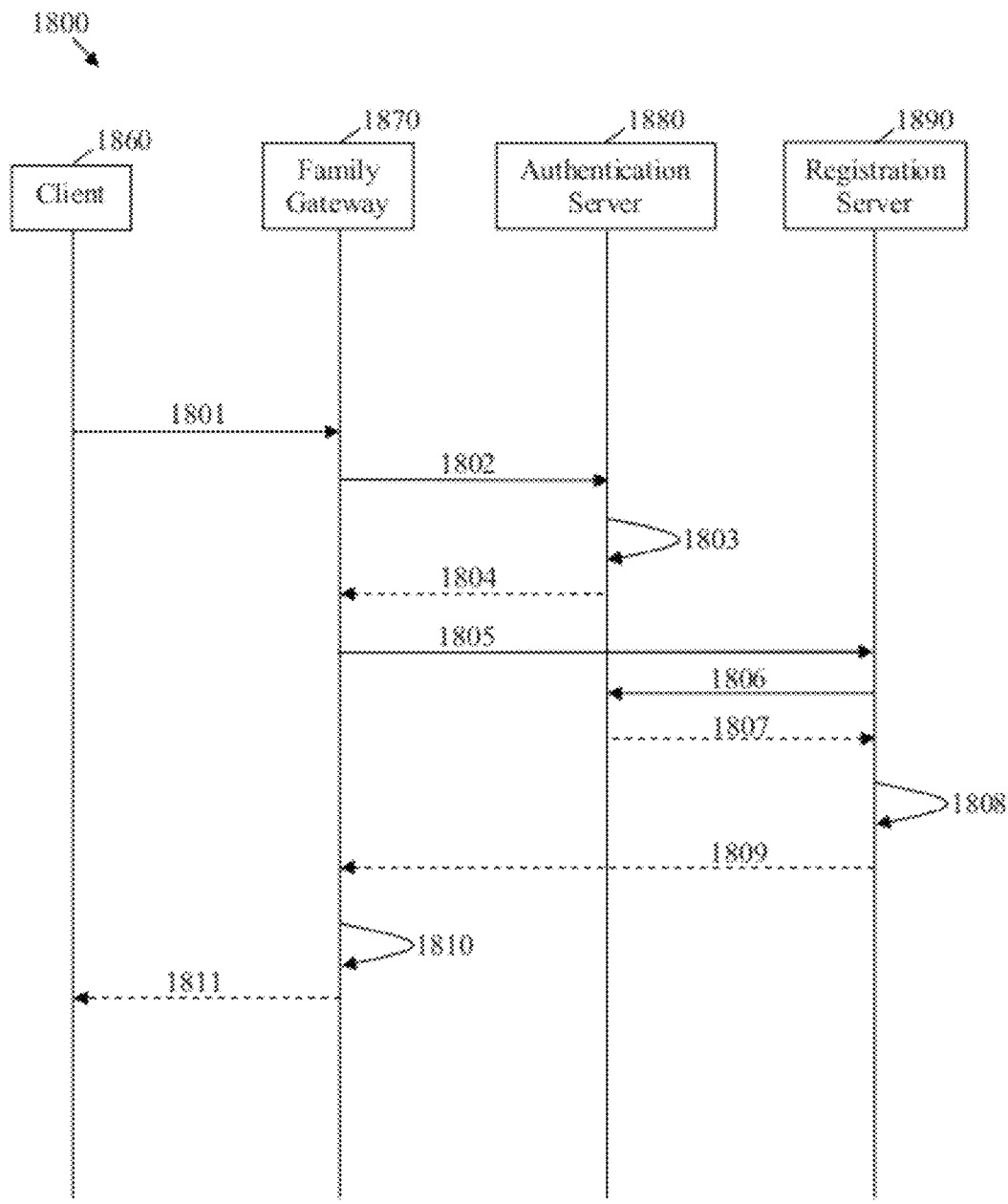
FIG. 16 is a protocol diagram of an embodiment of a gateway access method.

FIG. 16 illustrates an embodiment of a gateway access method 1800, which may be implemented in the digital family plan system 100. The gateway access method 1800 may be used to access a family space, e.g., to receive or download digital content, via a family gateway. The gateway access method 1800 may be implemented using a client 1860, a family gateway 1870, an authentication server 1880, and a registration server 1890, which may be configured as described above. At step 1801, the client 1860 may send a request for family content via the family gateway 1870. At step 1802, the family gateway 1870 may send a family certificate to the authentication server 1880. At step 1803, the authentication server 1880 may access the certificate information to authorize/authenticate the client 1860.

At step 1804, the authentication server 1880 may send the authentication result to the family gateway 1870. At step 1805, the family gateway 1870 may send an encrypted request for family space to the registration server 1890. At step 1806, the registration server 1890 may request gateway information from the authentication server 1880. At step 1807, the authentication server 1880 may return an encryption key to the registration server 1890. At step 1808, the registration server 1890 may cache a session for the client 1860, decrypt the request for family space (using the encryption key), and encrypt a response to the request. At step 1809, the registration server 1890 may return a response for the request to the family gateway 1870. At step 1810, the family gateway 1870 may decrypt the response from the registration server 1890. At step 1811, the family gateway 1870 may forward the decrypted response to the client 1860. The method 1800 may then end. Some of the optional steps in the method 1800 are indicated using dashed arrow lines in FIG. 16.

Figure 17:
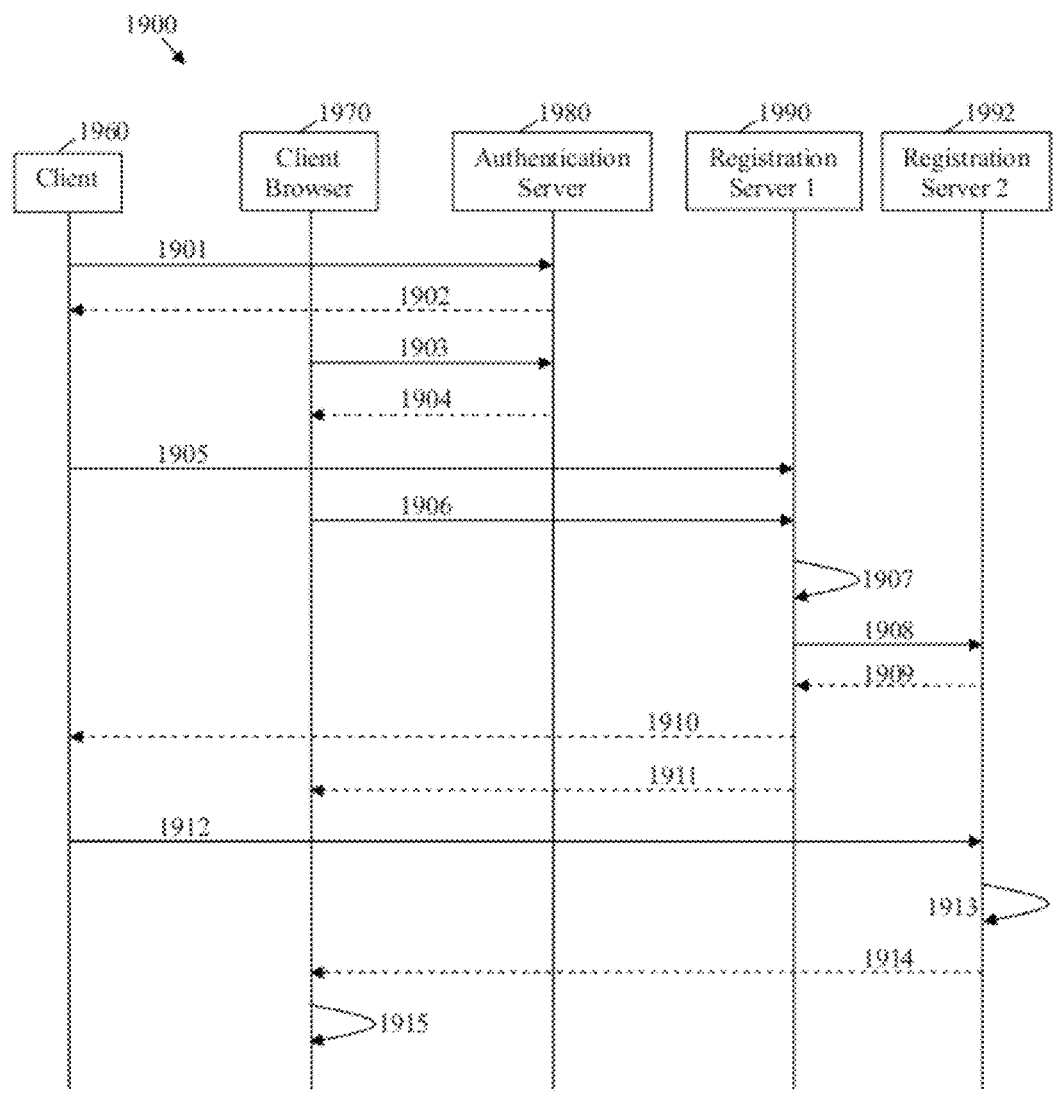
FIG. 17 is a protocol diagram of an embodiment of a peer-to-peer (P2P) communication method.

FIG. 17 illustrates an embodiment of a P2P communication method 1900, which may be implemented in the digital family plan system 100. The P2P communication method 1900 may be used to allow two members or two member devices to establish a secured P2P communication in the family space system, e.g., to exchange messages or digital content. The P2P communication method 1900 may be implemented using a client 1960, a client browser 1970, an authentication server 1980, a first registration server 1990, and a second registration server 1992, which may be configured as described above. At step 1901, the client 1960 may send a request to authenticate a first member to the authentication server 1980. At step 1902, the authentication server 1980 may return an authentication result and a session key to the client 1960. At step 1903, the client browser 1970 may forward an authentication request for a second member to the authentication server 1980. The second member may communicate with the client browser 1970 via a second client device (not shown). At step 1904, the authentication server 1980 may return an authentication result and the session key to the client browser 1970. At step 1905, the client 1960 may send a request for a communication key and the session key for the first member to the first registration server 1990. At step 1906, the client browser 1970 may send a request for a communication key and the session key for the second member to the first registration server 1990.

At step 1907, the first registration server 1990 may generate a communication key. At step 1908, the first registration server 1990 may send the communication key to the second registration server 1992. At step 1909, the second registration server 1992 may send a confirmation to the first registration server 1990. At step 1910, the first registration server 1990 may return the communication key to the client 1960. At step 1911, the first registration server 1990 may return the same communication key to the client browser 1970. At step 1912, the client 1960 may forward a message intended to the second member (e.g., to the second member device) to the first registration server 1990. The message may be encrypted using the communication key, e.g., over a secured channel. At step 1913, the second registration server 1992 may decrypt the message and re-encrypt the message. At step 1914, the second registration server 1992 may return the encrypted message to the client browser 1970. At step 1915, the client browser 1970 may decrypt the message using the communication key. The client browser 1970 may then send the message to the second member device. The method 1900 may then end. Some of the optional steps in the method 1900 are indicated using dashed arrow lines in FIG. 17.

Figure 18:
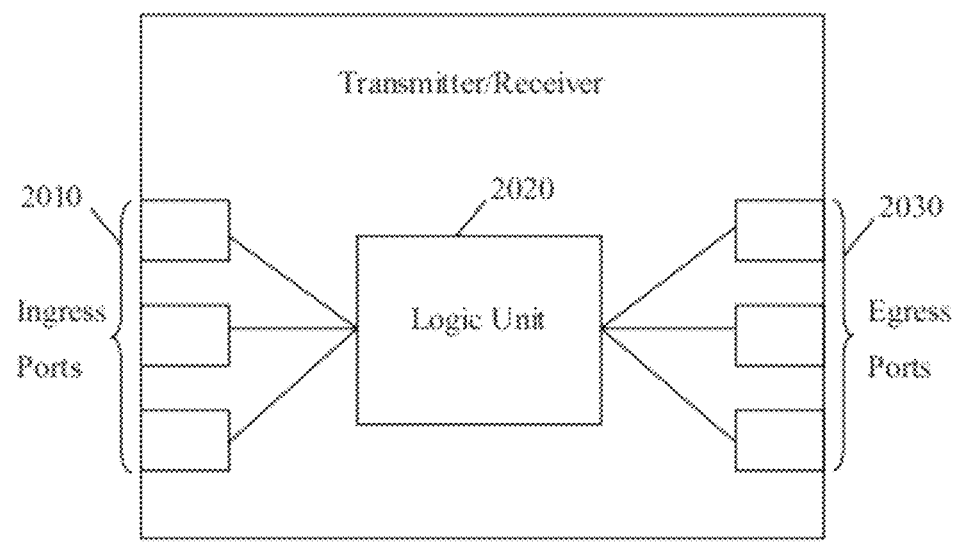
FIG. 18 is a schematic diagram of an embodiment of a transmitter/receiver unit.

FIG. 18 illustrates an embodiment of a transmitter/receiver unit 2000, which may be any device that transports packets through a network. For instance, the transmitter/receiver unit 2000 may be located at a family member device, a family gateway, a local family space, and/or a family space on cloud. The transmitted/receiver unit 2000 may comprise one or more ingress ports or units 2010 for receiving packets, objects, or TLVs from other network components, logic unit 2020 to determine which network components to send the packets to, and one or more egress ports or units 2030 for transmitting frames to the other network components. Logic unit 2020 may be implemented in software, hardware, firmware, or some combination thereof.

Figure 19:
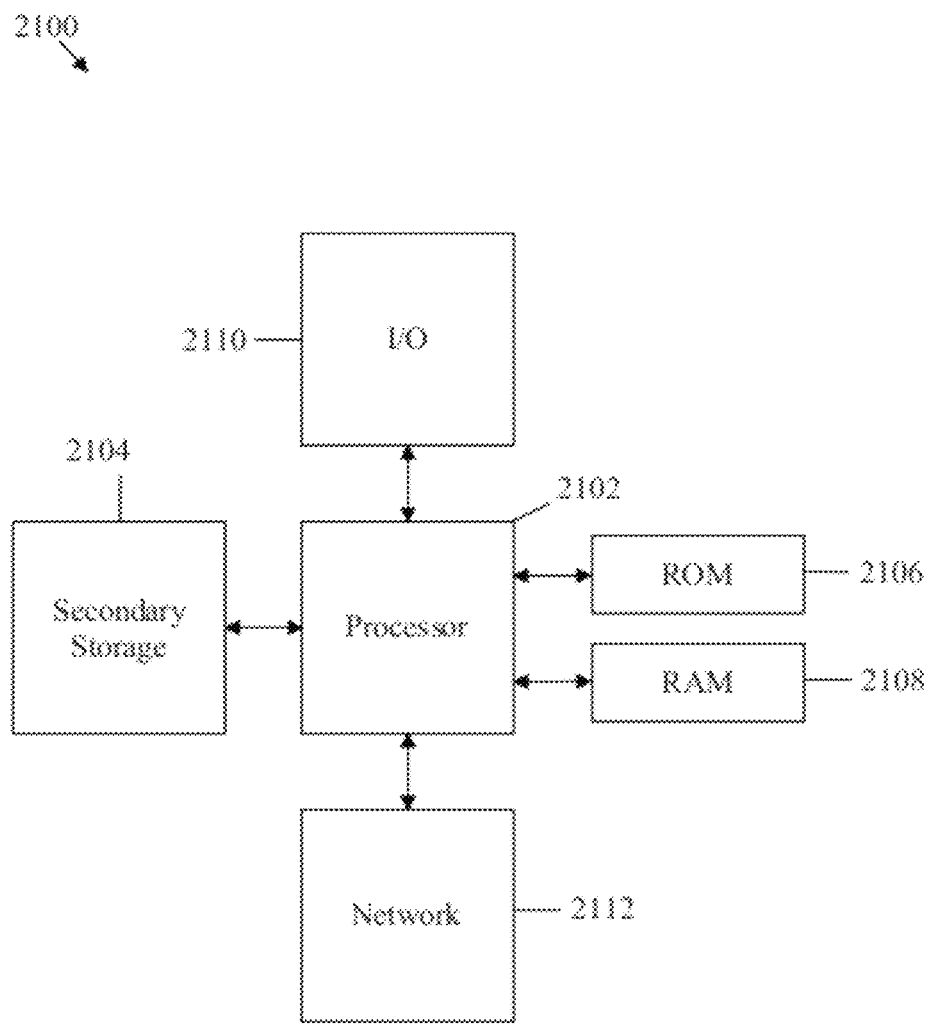
FIG. 19 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 19 illustrates a typical, general-purpose network component 2100 suitable for implementing one or more embodiments of the components disclosed herein. The network component 2100 includes a processor 2102 (which may be referred to as a central processor unit or CPU) that is in communication with memory devices including second storage 2104, read only memory (ROM) 2106, random access memory (RAM) 2108, input/output (I/O) devices 2110, and network connectivity devices 2112. The processor 2102 may be implemented as one or more CPU chips, or may be part of one or more application specific integrated circuits (ASICs).

The second storage 2104 is typically comprised of one or more disk drives or tape drives and is used for non-volatile storage of data and as an over-flow data storage device if RAM 2108 is not large enough to hold all working data. Second storage 2104 may be used to store programs that are loaded into RAM 2108 when such programs are selected for execution. The ROM 2106 is used to store instructions and perhaps data that are read during program execution. ROM 2106 is a non-volatile memory device that typically has a small memory capacity relative to the larger memory capacity of second storage 2104. The RAM 2108 is used to store volatile data and perhaps to store instructions. Access to both ROM 2106 and RAM 2108 is typically faster than to second storage 2104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for managing, storing and providing shared digital content to a group of users in a multi-platform environment, comprising:
    a cloud storage component configured to store digital content items that are shared by members in a user relationship defined group;
    a registration engine coupled to the cloud storage component and configured to:
        receive one or more requests to link a first client device and a second client device to the user relationship defined group; and
        transmit a family certificate comprising device identifiers (IDs) associated with the first client device and the second client device to a family gateway, wherein the family certificate is transmitted to the family gateway to support authentication of the first client device and the second client device;
    an authentication engine coupled to the registration engine and configured to authenticate the first client device and the second client device upon receiving the family certificate; and
    a cloud service component coupled to the authentication engine and configured to:
        subsequent to authentication, provide a first portion of one of the digital content items to the first client device for a first member of the user relationship defined group in a format suitable for the first client device;
        receive an indication that a user is changing access to the second client device; and
        subsequent to authentication, provide a second portion of the one of the digital content items to the second client device in a format suitable for the second client device,
        wherein the first client device and the second client device are different devices, and
        wherein the format suitable for the first client device is different from the format suitable for the second client device.

2. The system of claim 1, wherein the cloud service component is further configured to enforce access restriction policy defined by an administrative member of the user relationship defined group.

3. The system of claim 1, wherein the cloud service component is further configured to enforce license terms for the digital content.

4. The system of claim 1, wherein the digital content comprises a restricted access digital content item, and wherein the cloud service component is further configured to:
  receive a request for access to the restricted access digital content item from an access restricted member of the user relationship defined group; and
  forward the request to a client device of an administrative member of the user relationship defined group.

5. The system of claim 4, wherein the cloud service component is further configured to provide the restricted access digital content item to the access restricted member of the user relationship defined group when the administrative member of the user relationship defined group submits approval for the access restricted member of the user relationship defined group to access the restricted access digital content.

6. The system of claim 1, wherein the user relationship defined group members communicate with the cloud service component via at least one of a wireless and a wired communication link.

7. The system of claim 1, wherein the cloud service component is configured to provide at least one of a service for managing a user relationship defined group member, a user relationship defined group content, an access control, a user relationship defined group account, a user relationship defined group license, a transaction, a revenue sharing, a terminal hand off, digital content marketplace, a user relationship defined group social network, a device, and a communication channel.

8. The system of claim 1, wherein the cloud service component is configured to manage different types of licenses for different ones of the digital content, and wherein the different types of licenses comprise a license limited by a total number of minutes, a license limited by an expiration time or date, and a license limited by the number of installations.

9. The system of claim 1, wherein the first portion of the digital content items is provided to the first client device at a first location, the second portion of the digital content items is provided to the first client device at a second location, and wherein the first location is not the second location.

10. The system of claim 1, wherein one of the client devices is a mobile device.

11. The system of claim 1, wherein the one of the digital content items comprises streaming digital content.

12. The system of claim 11, wherein the indication that the user is changing access to the second client device is a request to change a delivery point of the streaming digital content.

13. The system of claim 12, wherein the streaming digital content comprises video.

14. A computer implemented method comprising:
  storing a plurality of digital content items shared by a plurality of user relationship defined group members of a user relationship defined group in one or more cloud network storage devices;
  implementing, with a processor, group controls on the plurality of digital content items, wherein different user relationship defined group members have different rights of access to the plurality of digital content items;
  receiving, with a receiver, one or more requests to link a first client device and a second client device to the user relationship defined group; and
  transmitting a family certificate comprising identifiers (IDs) associated with the first client device and the second client device to a family gateway, wherein the family certificate is transmitted to the family gateway to support authentication of the first client device and the second client device;
  authenticating the first client device and the second client device upon receiving the family certificate;
  subsequent to authentication, providing, with a transmitter, a first portion of one of the plurality of digital content items to a first client device for a user relationship defined group member in a first format;
  receiving a notice that the member is changing access to a second client device; and
  subsequent to authentication, providing a second portion of the one of the plurality of digital content items to a second client device in a second format,
  wherein the first client device is different from the second client device, and
  wherein the first format and the second format are different.

15. The computer implemented method of claim 14, further comprising:
  receiving a purchasing request for a digital content item from a requesting member of the user relationship defined group;
  prompting an administrator member of the user relationship defined group to authorize or deny the purchasing request;
  receiving a response from the administrator member;
  determining with a processor whether the response authorizes the purchasing request; and
  providing with a processor the digital content item corresponding to the purchasing request to the requesting user relationship defined group member if the response from the administrator member authorizes the purchasing request.

16. The computer implemented method of claim 14, wherein the plurality of digital content items comprises at least one of video, music, an application, a video game, an electronic book (ebook), and other multimedia.

17. The computer implemented method of claim 14, wherein the first portion of the digital content items is provided to the first client device at a first location, the second portion of the digital content items is provided to the first client device at a second location, and wherein the first location is not the second location.

18. The computer implemented method of claim 14, wherein the notice that the member is changing access to the second client device comprises a request to change a delivery point of streaming digital content.

* * * * *